US012760805B2

(12) United States Patent
Woo et al.

(10) Patent No.: US 12,760,805 B2
(45) Date of Patent: Oct. 13, 2026

(54) VALVE ASSEMBLY FOR CONTROLLING FLUID

(71) Applicant: Hanon Systems, Daejeon (KR)

(72) Inventors: Sang Gu Woo, Daejeon (KR); Kyung Tae Noh, Daejeon (KR); Hae Jun Lee, Daejeon (KR)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 18/727,714

(22) PCT Filed: Apr. 5, 2023

(86) PCT No.: PCT/KR2023/004593

§ 371 (c)(1),
(2) Date: Jul. 10, 2024

(87) PCT Pub. No.: WO2023/200175

PCT Pub. Date: Oct. 19, 2023

(65) Prior Publication Data

US 2025/0075811 A1 Mar. 6, 2025

(30) Foreign Application Priority Data

Apr. 11, 2022 (KR) ........................ 10-2022-0044597
May 13, 2022 (KR) ........................ 10-2022-0058882

(51) Int. Cl.
*F16K 11/085* (2006.01)
*F16K 11/076* (2006.01)
(Continued)

(52) U.S. Cl.
CPC ........ *F16K 11/0856* (2013.01); *F16K 11/076* (2013.01); *F16K 11/085* (2013.01);
(Continued)

(58) Field of Classification Search
CPC .. F16K 11/0856; F16K 11/076; F16K 11/085; F16K 27/06; F16K 31/04;
(Continued)

(56) References Cited

U.S. PATENT DOCUMENTS 510,425 A * 12/1893 Hedley ............... F16K 11/0856
137/10
4,169,491 A * 10/1979 Bajka .................... F16K 11/085
126/563
(Continued)

FOREIGN PATENT DOCUMENTS

CN 114001175 A 2/2022
KR 10-1804764 B 12/2017
(Continued)

OTHER PUBLICATIONS

International Search Report issued in PCT/KR2023/004593 on Jul. 10, 2023.

*Primary Examiner* — Matthew W Jellett
(74) *Attorney, Agent, or Firm* — NORTON ROSE FULBRIGHT US LLP

(57) ABSTRACT

The present invention relates to a valve assembly for controlling fluid. The valve assembly for controlling fluid, according to one embodiment of the present invention, comprises: a housing; an actuator coupled to one side of the housing so as to provide power; a rotor which can rotate inside the housing and which receives power from the actuator; and a port unit which is coupled to one side of the housing, and to which a fluid hose is connected, wherein the rotor can be divided such that at least two multi-way valves can be controlled.

19 Claims, 25 Drawing Sheets

(51) Int. Cl.
*F16K 27/06* (2006.01)
*F16K 31/04* (2006.01)

(52) U.S. Cl.
CPC .............. *F16K 27/06* (2013.01); *F16K 31/04* (2013.01); *F16K 31/041* (2013.01)

(58) Field of Classification Search
CPC ................... F16K 31/041; F16K 3/262; Y10T 137/86871; Y10T 137/87249; Y10T 137/86566
See application file for complete search history.

(56) References Cited

U.S. PATENT DOCUMENTS

| | | | | |
|---|---|---|---|---|
| 4,285,365 | A * | 8/1981 | Coats | F16K 11/0856 137/625.15 |
| 4,517,938 | A | 5/1985 | Krueger | |
| 8,813,783 | B2 * | 8/2014 | Morris | F16K 11/0856 137/625.18 |
| 8,931,515 | B2 * | 1/2015 | Linnhoff | F16K 11/0856 137/625.46 |
| 11,592,116 | B2 * | 2/2023 | Svejcar | F16K 11/085 |
| 12,416,367 | B2 * | 9/2025 | Lin | F01P 7/165 |
| 2021/0131575 | A1 * | 5/2021 | Bunda | F16K 5/0471 |
| 2022/0316607 | A1 * | 10/2022 | Surve | F16K 27/065 |

FOREIGN PATENT DOCUMENTS

| | | | |
|---|---|---|---|
| KR | 20200101671 | A | 8/2020 |
| KR | 20210056729 | A | 5/2021 |

* cited by examiner (a)

(b)

(a)

(b)

(a)

(b)

VALVE ASSEMBLY FOR CONTROLLING FLUID

CROSS REFERENCE TO RELATED APPLICATIONS

This patent application is a national phase under 35 U.S.C. § 371 of International Patent Application No. PCT/KR2023/004593 filed Apr. 5, 2023, which claims the benefit of priority from Korean Patent Application Nos. 10-2022-0044597 filed Apr. 11, 2022, and 10-2022-0058882 filed May 13, 2022, each of which is hereby incorporated herein by reference in its entirety for all purposes.

TECHNICAL FIELD

The present invention relates to a fluid control valve assembly, and more specifically, to a fluid control valve assembly for controlling a flow rate of a fluid circulating an engine of a vehicle.

BACKGROUND ART

A valve assembly used in an air-conditioning system of a vehicle is a valve constituting a 3-way or 4-way fluid doorway and is an automatic control valve combined with a control motor to change a flow path of a fluid and also control a flow rate of the fluid.

Such a conventional valve assembly is installed to have a compressor, a heater core, and a flow path and controls a flow of a fluid (cooling water or coolant) circulating an engine of a vehicle to adjust an indoor temperature by allowing the fluid to be introduced into the heater core or bypass the heater core.

A valve assembly is formed as a single assembly by integrating a housing in which a plurality of fluid ports are formed, a rotor which changes a flow path of a fluid, a sheet member preventing leak of the fluid, and an actuator for driving the rotor.

Since each of the components constituting the fluid control valve assembly is provided as a single assembly, when a complex system requiring a plurality of valves is formed, the number of valves increases, thus there is a problem of increasing costs of an entire system, and there is a unsuitable limit for fluid modularization (a storage tank, a water pump, and a valve).

DISCLOSURE

Technical Problem

The present invention is directed to providing a fluid control valve assembly having a structure in which a plurality of multi-way valves are disposed in a single assembly.

The present invention is directed to providing a fluid control valve assembly having a structure in which a plurality of multi-way valves including different numbers of n-way valves are disposed in a single assembly.

Technical Solution

One aspect of the present invention provides a fluid control valve assembly including a housing, an actuator which is coupled to one side of the housing and provides power, a rotor which is rotatably installed in the housing and receives the power from the actuator, and a port unit coupled to one side of the housing and connected to a fluid hose, wherein the rotor is formed to be divided to control at least two multi-way valves.

The rotor may be divided into a plurality of compartments in an axial direction and a rotation direction to form unit compartments, and at least some of the unit compartments may be formed to communicate with each other.

The unit compartments may be divided into three rooms in the axial direction and eight rooms in the rotation direction to form a total of 24 rooms, and the port may be provided as a total of six ports.

The rotor may control a valve to be driven in a total of four modes by rotating in a unit of a central angle of 90°.

In the $n^{th}$ mode (n is in the range of 1 to 4), in a bottom view, in the unit compartments of the rotor, an n-1 compartment may be disposed in a first row and a first column, an n-2 compartment may be disposed in a second row and the first column, an n-3 compartment may be disposed in the second row and a second column, an n-4 compartment may be disposed in the first row and the second column, an n-5 compartment may be disposed in the second row and a third column, and an n-6 compartment may be disposed in the first row and the third column, wherein the n-1 to n-3 compartments may operate as a first 3-way valve, the n-4 to n-6 compartments may operate as a second 3-way valve, the port unit may be provided as a first port, a second port, a third port, a fourth port, a fifth port, and a sixth port corresponding to the n-1 to n-6 compartments, respectively.

In the first mode, the 1-1 compartment and the 1-2 compartment may be formed to be open and communicate with the first port and the second port to open the first 3-way valve, and the 1-3 compartment may be formed to be closed; and the 1-4 compartment may be formed to be closed, and the 1-5 compartment and the 1-6 compartment may be formed to be open and communicate with the fifth port and the sixth port to open the second 3-way valve.

In the second mode, the 2-1 compartment and the 2-2 compartment may be formed to be open and communicate with the first port and the second port to open the first 3-way valve, and the 2-3 compartment may be formed to be closed, and the 2-4 compartment and the 2-6 compartment may be formed to be open and communicate with the fourth port and the sixth port to open the second 3-way valve, and the 2-5 compartment may be formed to be closed.

In the third mode, the 3-1 compartment may be formed to be closed, and the 3-2 compartment and the 3-3 compartment may be formed to be open and communicate with the second port and the third port to open the first 3-way valve, and the 3-4 compartment may be formed to be closed, and the 3-5 compartment and the 3-6 compartment may be formed to be open and communicate with the fifth port and the sixth port to open the second 3-way valve.

In the fourth mode, the 4-1 compartment may be formed to be closed, and the 4-2 compartment and the 4-3 compartment may be formed to be open and communicate with the second port and the third port to open the first 3-way valve, and the 4-4 compartment and the 4-5 compartment may be formed to be open and communicate with the fourth port and the sixth port to open the second 3-way valve, and the 4-6 compartment may be formed to be closed.

Another aspect of the present invention provides a fluid control valve assembly including a housing, an actuator which is coupled to one side of the housing and provides power, a rotor which is rotatably installed in the housing and receives the power from the actuator, and a port unit coupled to one side of the housing and connected to a fluid hose, wherein the rotor is formed to be divided to control two or more multi-way valves including different numbers (n) of n-way valves.

The rotor may be divided into a plurality of compartments in an axial direction and a rotation direction to form unit compartments, and at least some of the unit compartments may be formed to communicate with each other.

The unit compartments may be divided into seven rooms in the axial direction and 12 rooms in the rotation direction to form a total of 84 rooms, and the port may be provided as a total of 14 ports.

The rotor may control a valve to be driven in a total of six modes by rotating in a unit of a central angle of 60°.

In a bottom view of the unit compartments of the rotor in an $n^{th}$ mode (n is in the range of 1 to 6), an n-1 compartment may be disposed in a second row and a first column, an n-2 compartment may be disposed in a first row and the first column, an n-3 compartment may be disposed in the second row and the first column, an n-4 compartment may be disposed in the second row and a second column, an n-5 compartment may be disposed in the second row and a third column, an n-6 compartment may be disposed in the first row and the third column, an n-7 compartment may be disposed in the first row and a fourth column, an n-8 compartment may be disposed in the second row and the fourth column, an n-9 compartment may be disposed in the first row and a fifth column, an n-10 compartment may be disposed in the second row and the fifth column, an n-11 compartment may be disposed in the first row and a sixth column, an n-12 compartment may be disposed in the second row and a seventh column, an n-13 compartment may be disposed in the second row and the sixth column, and an n-14 compartment may be disposed in the first row and the seventh column.

wherein the n-1 to n-4 compartments may operate as a first 4-way valve, the n-5 to n-8 compartments may operate as a second 4-way valve, the n-9 to n-11 compartments may operate as a first 3-way valve, the n-12 to n-14 compartments may operate as a second 3-way valve, and the port unit may be provided as first to $14^{th}$ ports corresponding to the n-1 to n-14 compartment, respectively.

In the first mode, the 1-1 compartment and the 1-2 compartment may be formed to be closed, and the 1-3 compartment and the 1-4 compartment may be formed to be open and communicate with the third port and the fourth port to open the first 4-way valve, the 1-5 compartment and the 1-8 compartment may be formed to be closed, and the 1-6 compartment and the 1-7 compartment may be formed to be open and communicate with the sixth port and the seventh port to open the second 4-way valve, the 1-9 compartment and the 1-11 compartment may be formed to be open and communicate with the ninth port and the $11^{th}$ port to open the first 3-way valve, and the 1-10 compartment may be formed to be closed, the 1-12 compartment, the 1-13 compartment, and the 1-14 compartment may be formed to be open, a first opening cover may be provided on an outer side of the 1-12 compartment, and the 1-12 compartment may not communicate with the $12^{th}$ port, and the 1-13 compartment and the 1-14 compartment may communicate with the $13^{th}$ port and the $14^{th}$ port while communicating through the 1-12 compartment to open the second 3-way valve.

In the second mode, the 2-1 compartment and the 2-2 compartment may be formed to be open and communicate with the first port and the second port to open the first 4-way valve, and the 2-3 compartment and the 2-4 compartment may be formed to be open and communicate with the third port and the fourth port to open the first 4-way valve, the 2-5 compartment and the 2-6 compartment may be formed to be open and communicate with the fifth port and the sixth port to open the second 4-way valve, and the 2-7 compartment and the 2-8 compartment may be formed to be open and communicate with the seventh port and the eighth port to open the second 4-way valve, the 2-9 compartment and the 2-11 compartment may be formed to be open and communicate with the ninth port and the $11^{th}$ port to open the first 3-way valve, and the 2-10 compartment may be formed to be closed, and the 2-12 compartment and the 2-14 compartment may be formed to be open and communicate with the $12^{th}$ port and the $14^{th}$ port to open the second 3-way valve, and the 2-13 compartment may be formed to be closed.

In the third mode, the 3-1 compartment and the 3-2 compartment may be formed to be open and communicate with the first port and the second port to open the first 4-way valve, and the 3-3 compartment and the 3-4 compartment may be formed to be open and communicate with the third port and the fourth port to open the first 4-way valve, the 3-5 compartment 105 and the 3-6 compartment 106 may be formed to be open and communicate with the fifth port and the sixth port to open the second 4-way valve, and the 3-7 compartment and the 3-8 compartment may be formed to be open and communicate with the seventh port and the eighth port to open the second 4-way valve, the 3-9 compartment and the 3-11 compartment may be formed to be open and communicate with the ninth port and the $11^{th}$ port to open the first 3-way valve, and the 3-10 compartment may be formed to be closed, the 3-12 compartment, the 3-13 compartment, and the 3-14 compartment may be formed to be open, a third opening cover may be provided on one side of the 3-12 compartment, and the 3-12 compartment may not communicate with the $12^{th}$ port, and the 3-13 compartment and the 3-14 compartment may communicate with the $13^{th}$ port and the $14^{th}$ port while communicating through the 3-12 compartment to open the second 3-way valve.

In the fourth mode, the 4-5 compartment and the 4-8 compartment may be formed to be open and communicate with the fifth port and the eighth port to open the second 4-way valve, and the 4-6 compartment and the 4-7 compartment may be formed to be open and communicate with the sixth port and the seventh port to open the second 4-way valve, the 4-9 compartment and the 4-10 compartment may be formed to be open and communicate with the ninth port and the $10^{th}$ port to open the first 3-way valve, and the 4-11 compartment may be formed to be closed, the 4-12 compartment, the 4-13 compartment, and the 4-14 compartment may be formed to be open, a fourth opening cover may be provided on an outer side of the 4-12 compartment, and the 4-12 compartment may not communicate with the $12^{th}$ port, and the 4-13 compartment and the 4-14 compartment may communicate with the 13$^{th}$ port and the 14$^{th}$ port while communicating through the 4-12 compartment to open the second 3-way valve.

In the fifth mode, the 5-1 compartment and the 5-4 compartment may be formed to be open and communicate with the first port and the fourth port to open the first 4-way valve, and the 5-2 compartment and the 5-3 compartment may be formed to be closed, the 5-5 compartment and the 5-8 compartment may be formed to be open and communicate with the fifth port and the eighth port to open the second 4-way valve, and the 5-6 compartment and the 5-7 compartment may be formed to be open and communicate with the sixth port and the seventh port to open the second 4-way valve, the 5-9 compartment and the 5-10 compartment may be formed to be open and communicate with the ninth port and the 10$^{th}$ port to open the first 3-way valve, and the 5-11 compartment may be formed to be closed, and the 5-12 compartment, the 5-13 compartment, and the 5-14 compartment may be formed to be open and communicate with all the 12$^{th}$ port, the 13$^{th}$ port, and the 14$^{th}$ port to open the second 3-way valve.

In the sixth mode, the 6-1 compartment and the 6-4 compartment may be formed to be open and communicate with the first port and the fourth port to open the first 4-way valve, and the 6-2 compartment and the 6-3 compartment may be formed to be closed, the 6-5 compartment and the 6-6 compartment may be formed to be open and communicate with the fifth port and the sixth port to open the second 4-way valve, and the 6-7 compartment and the 6-8 compartment may be formed to be open and communicate with the seventh port and the eighth port to open the second 4-way valve, the 6-9 compartment and the 6-10 compartment may be formed to be open and communicate with the ninth port and the 10$^{th}$ port to open the first 3-way valve, and the 6-11 compartment may be formed to be closed, and the 6-12 compartment and the 6-14 compartment may be formed to be open and communicate with the 12$^{th}$ port and the 14$^{th}$ port to open the second 3-way valve, and the 6-13 compartment may be formed to be closed.

Advantageous Effects

According to one embodiment of the present invention, since a fluid control valve assembly has a structure in which a plurality of multi-way valves are disposed in a single valve assembly, a product thereof can be miniaturized, and a total component cost can be reduced.

According to one embodiment of the present invention, since a fluid control valve assembly has a structure in which a plurality of multi-way valves including different numbers (n) of n-way valves are disposed in a single valve assembly, a product thereof can be miniaturized, and a total component cost can be reduced.

MODES OF THE INVENTION

Figure 1:
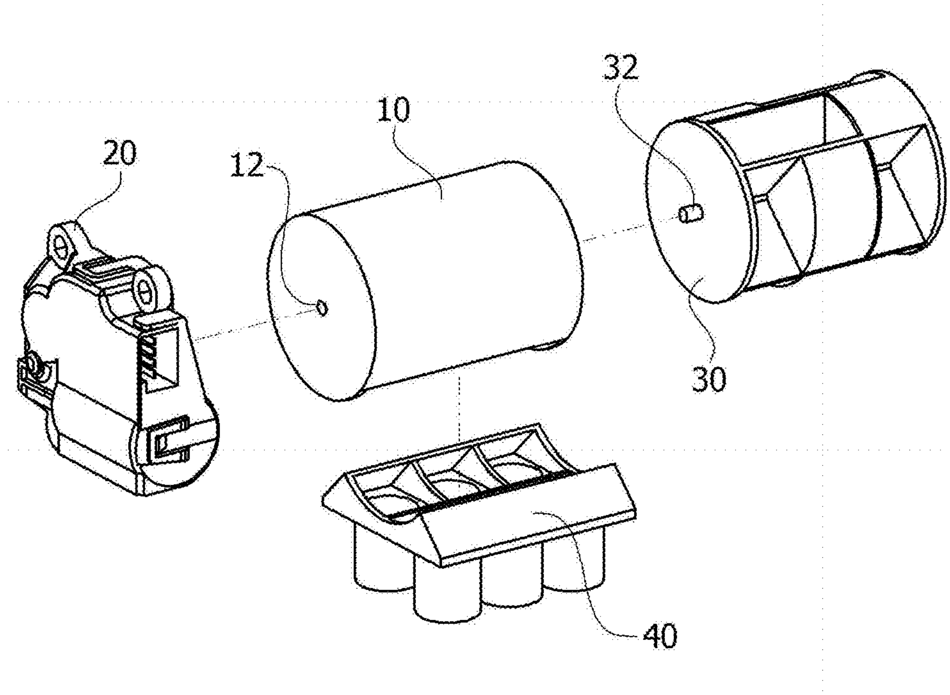
FIG. 1 is an exploded perspective view illustrating a fluid control valve assembly according to one embodiment of the present invention.

Since the present invention may be variously modified and have several embodiments, specific embodiments will be illustrated in the accompanying drawings and described in detail. However, this is not intended to limit the present invention to the specific embodiments, and it should be appreciated that all changes, equivalents, and substitutes falling within the spirit and technical scope of the present invention are encompassed in the present invention. In the description of the embodiments, certain detailed descriptions of the related art will be omitted when it is deemed that they may unnecessarily obscure the gist of the inventive concept.

Terms such as "first" and "second" may be used to describe various components, but such components are not limited by the above terms. These terms are used only to distinguish one component from another.

Terms used herein are only for the purpose of describing particular embodiments and are not intended to limit the present invention. Singular forms are intended to include the plural forms, unless the context clearly indicates otherwise. In the present specification, it should be understood that the terms "comprise," "comprising," "include," and/or "including" used herein specify the presence of stated features, numbers, steps, operations, elements, components, and/or combinations thereof but do not preclude the presence or addition of one or more other features, numbers, steps, operations, elements, components, and/or combinations thereof.

In addition, throughout the specification, when components are "connected," this may not only mean that two or more components are directly connected, but this may also mean that two or more components are indirectly connected through other components or are physically connected and also electrically connected, or are one thing even referred to as different names according to positions or functions thereof.

Hereinafter, one embodiment of a fluid control valve assembly will be described in detail with reference to the accompanying drawings, and when the embodiment is described with reference to the accompanying drawings, components which are the same or correspond to each other will be denoted by the same reference numerals, and redundant description thereof will be omitted.

Figure 2:
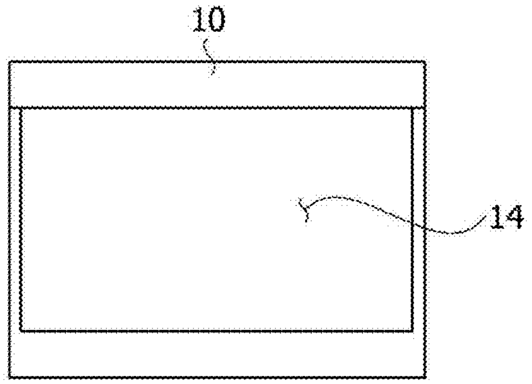
FIG. 2 is a bottom view illustrating a housing constituting the fluid control valve assembly.
Figure 3:
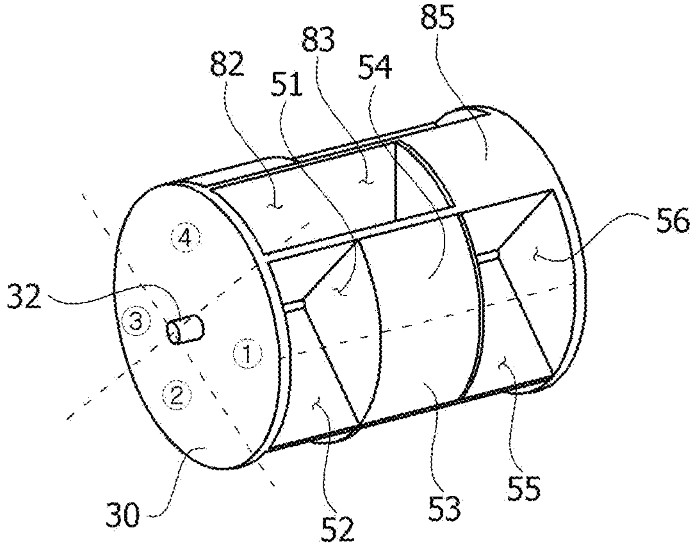
FIG. 3 is a schematic view illustrating first to fourth modes according to a shape of a rotor.
Figure 3:
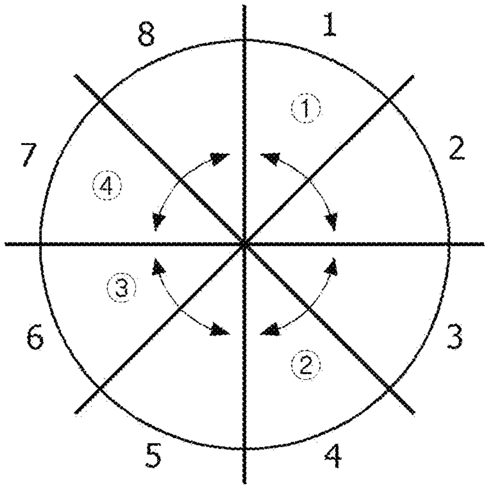

FIG. 1 is an exploded perspective view illustrating a fluid control valve assembly according to one embodiment of the present invention, FIG. 2 is a bottom view illustrating a housing constituting the fluid control valve assembly, and FIG. 3 is a schematic view illustrating first to fourth modes according to a shape of a rotor.

According to the drawings, the fluid control valve assembly according to one embodiment of the present invention may include a housing 10, an actuator 20 coupled to one side of the housing 10, a rotor 30 which is rotatably installed in the housing 10 and receives the power from the actuator 20, and a port unit 40 coupled to one side of the housing 10 and connected to fluid hoses, and the rotor 30 may be formed to be divided to control at least two multi-way valves.

The housing 10 may be formed in a cylindrical shape having a predetermined volume in which the rotor 30 is rotatably installed. A shaft hole 12 through which a rotor shaft 32 of the rotor 30 passes is formed in the housing 10. The shaft hole 12 is formed in a rotation axis direction of the housing 10. In addition, as illustrated in FIG. 2, an opening portion 14 is formed in a portion of a lower surface of the housing 10, and unit compartments of the rotor 30 may communicate with the port unit 40 through the opening portion 14.

The actuator 20 is installed in an axial direction of the housing 10 and serves as a power source which transmits power to the rotor 30. In the actuator 20, a driving shaft 22 extends in one direction, and the driving shaft 22 is coupled to the rotor shaft 32 to transmit the power to the rotor 30.

The rotor 30 may be formed in a cylindrical shape to be accommodated in the housing 10. The rotor shaft 32 is provided in the rotor 30 in an axial direction, and the rotor shaft 32 passes through the shaft hole 12 and protrudes to be coupled to the driving shaft 22. Accordingly, when the actuator 20 is driven, the rotor 30 receives the power through the driving shaft 22 and rotates at a predetermined angle to control opening or closing of valves.

Referring to FIG. 3, the rotor 30 may be divided into a plurality of compartments in the axial direction and a rotation direction to form the unit compartments, and at least some of the unit compartments may be formed to communicate with each other. In the present embodiment, the unit compartments are divided into three rooms in the axial direction and eight rooms in the rotation direction to form a total of 24 rooms. Among them, some compartments are completely open to serve to open valves, and the other are completely closed to serve to close valves.

In other words, the unit compartments are provided to open a portion of the rotor 30 having the cylindrical shape, that is, formed as spacers so that, as the rotor 30 rotates at a predetermined angle, some spacers communicate with each other to open valves. In addition, some of the unit compartments are provided to be closed, that is, formed in fully filled shapes, so that valves are closed.

Since the rotor 30 are divided into a total of eight rooms in the rotation direction, each room has a central angle of 45°. In addition, one mode may be defined and operated by two divided regions. In other words, a first mode to a fourth mode may be defined by a central angle of 90° in a circumferential direction of the rotor 30, and when the rotor 30 is driven in four modes, two valves may be integrally operated like a single valve.

Referring to FIG. 1 again, the port unit 40 is coupled to a lower portion of the housing 10. The port unit 40 is provided with a plurality of ports 41 to 46 connected to the fluid hoses and components. The ports 41 to 46 are formed to extend perpendicular to the axial direction of the rotor 30.

In the present embodiment, since at least two multi-way valves may be integrated as a single valve assembly and one actuator 20 may drive two or more valves, a structure can be simple, and component costs can be reduced. Hereinafter, an example of a structure in which two valves are integrated will be described, but the present invention is not limited thereto, and in a valve assembly, three or more valves may be integrally driven. According to the present embodiment, the valve assembly may be driven in a total of four modes, which will be described in detail below.

1. First Mode

Figure 4:
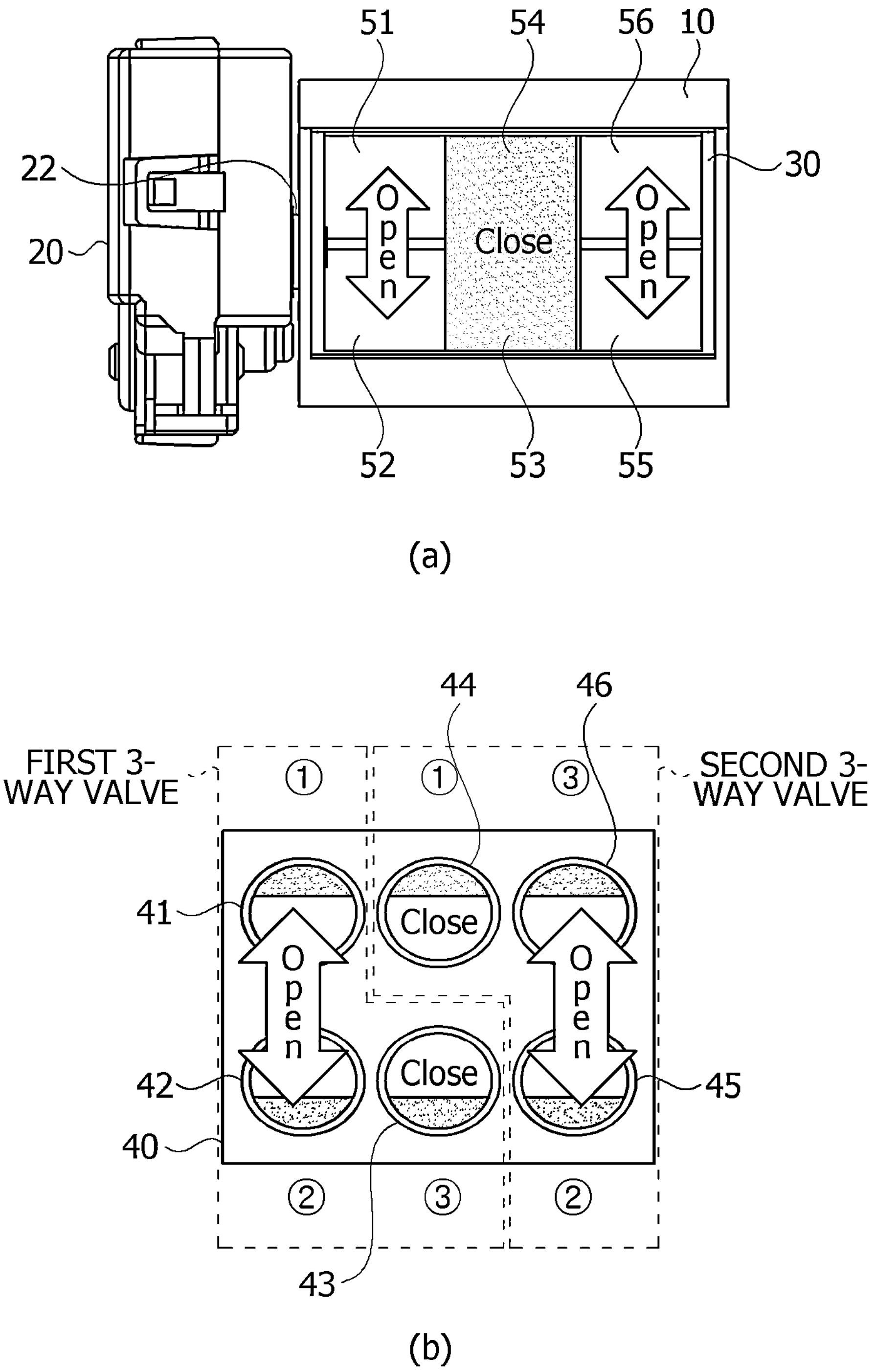
FIG. 4 shows a bottom view (see FIG. 4A) illustrating the rotor in the first mode and a plan view (see FIG. 4B) illustrating a port unit in the first mode according to one embodiment of the present invention.
Figure 5:
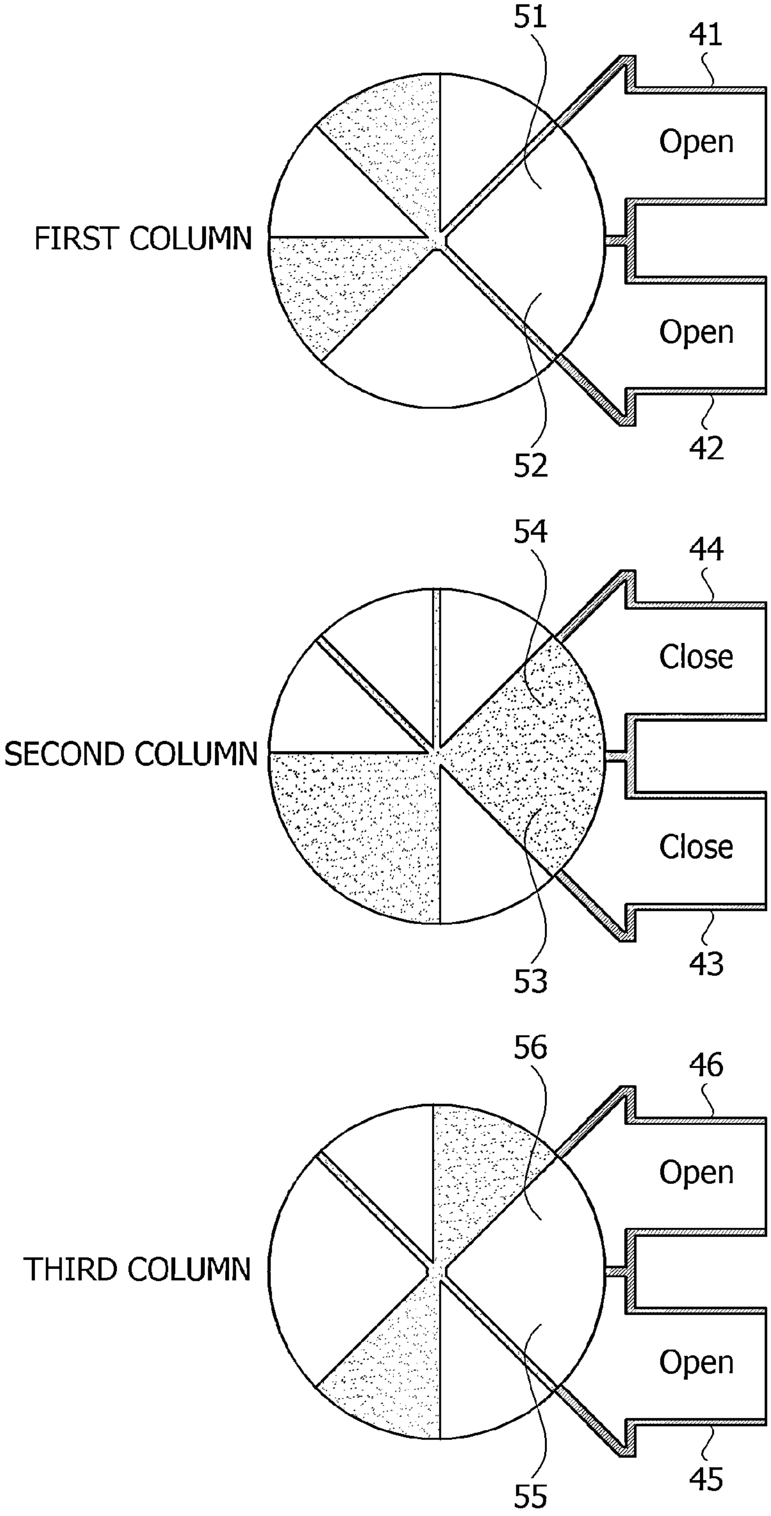
FIG. 5 is a view illustrating an open or closed state of a valve in the first mode according to one embodiment of the present invention.

FIG. 4 shows a bottom view (see FIG. 4A) illustrating the rotor in the first mode and a plan view (see FIG. 4B) illustrating the port unit in the first mode according to one embodiment of the present invention, and FIG. 5 is a view illustrating an open or closed state of a valve in the first mode according to one embodiment of the present invention.

Referring to FIG. 4, the unit compartments of the rotor 30 in the first mode are provided with a 1-1 compartment 51, a 1-2 compartment 52, a 1-3 compartment 53, a 1-4 compartment 54, a 1-5 compartment 55, and 1-6 compartment 56. The 1-1 to 1-6 compartments 51 to 56 are divided regions each having a central angle of 90° in the rotation direction of the rotor 30, and are provided with a total of six compartments.

In the present embodiment, in a bottom view, the 1-1 to 1-3 compartments 51 to 53 are driven as a first 3-way valve, and the 1-4 to 1-6 compartments 54 to 56 are driven as a second 3-way valve. In a bottom view, the 1-1 compartment 51 is disposed in a first row and a first column, the 1-2 compartment 52 is disposed in a second row and the first column, the 1-3 compartment 53 is disposed in the second row and a second column, the 1-4 compartment 54 is disposed in the first row and the second column, the 1-5 compartment 55 is disposed in the second row and a third column, and 1-6 compartment 56 is disposed in the first row and the third column.

In addition, the ports 41 to 46 are disposed at locations corresponding to the 1-1 to 1-6 compartments 51 to 56, respectively. In a plan view, the first port 41 is disposed in the first row and the first column, the second port 42 is disposed in the second row and the first column, the third port 43 is disposed in the second row and the second column, the fourth port 44 is disposed in the first row and the second column, the fifth port 45 is disposed in the second row and the third column, and the sixth port 46 is disposed in the first row and the third column.

In summary, the 1-1 to 1-3 compartments 51 to 53 and the first to third ports 41 to 43 operate together as the first 3-way valve, and the 1-4 to 1-6 compartments 54 to 56 and the fourth to sixth ports 44 to 46 operate together as the second 3-way valve.

As described above, the ports 41 to 46 may be disposed in two rows and three columns in the axial direction of the rotors 30, and the ports disposed in the same row and some ports among the ports disposed in different lows may communicate with each other to form the 3-way valves. Referring to FIG. 4, three ports among the ports 41 to 46 disposed in different rows to form the 3-way valve may communicate with each other to form a "⌉" or "L" shape. In the first mode in which the 1-1 compartment 51, the 1-2 compartment 52, and the 1-3 compartment 53 operate as the first 3-way valve, the 1-1 compartment 51 and the 1-2 compartment 52 are formed to be open, and the 1-3 compartment 53 is formed to be closed. Accordingly, in the first mode, the 1-1 compartment 51 and the 1-2 compartment 52 communicate with the first port 41 and the second port 42 to open the first 3-way valve. That is, as described above, the compartments adjacent to each other may communicate with each other even without a connecting component such as a separate fluid hose.

Meanwhile, in the first mode in which the 1-4 compartment 54, the 1-5 compartment 55, and the 1-6 compartment 56 operate as the second 3-way valve, the 1-4 compartment 54 is formed to be closed, and the 1-5 compartment 55 and the 1-6 compartment 56 are formed to be closed. Accordingly, in the first mode, the 1-5 compartment 55 and the 1-6 compartment 56 communicate with the fifth port 45 and the sixth port 46 to open the second 3-way valve.

In other words, as illustrated in FIG. 5, the 1-1 compartment 51 and the 1-2 compartment 52 disposed in the first column are open, the 1-3 compartment 53 and the 1-4 compartment 54 disposed in the second column are closed, and the 1-5 compartment 55 and the 1-6 compartment 56 are open.

2. Second Mode

Figure 6:
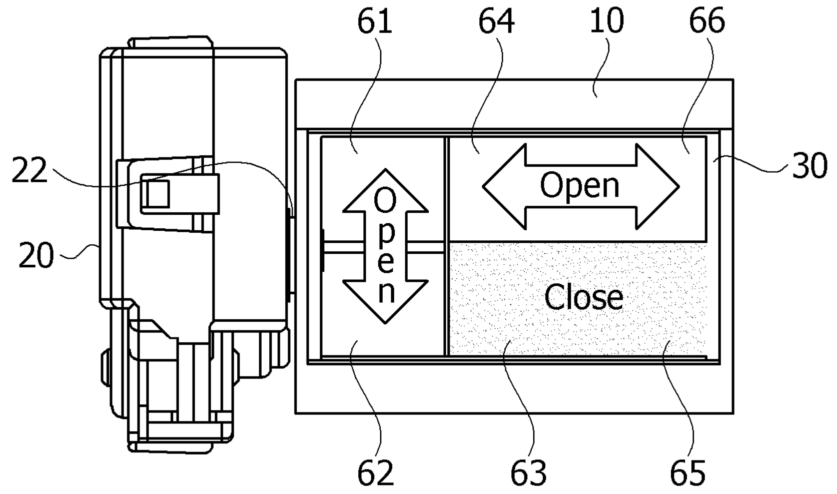
FIG. 6 shows a bottom view (see FIG. 6A) illustrating the rotor in the second mode and a plan view (see FIG. 6B) illustrating the port unit in the second mode according to one embodiment of the present invention.
Figure 6:
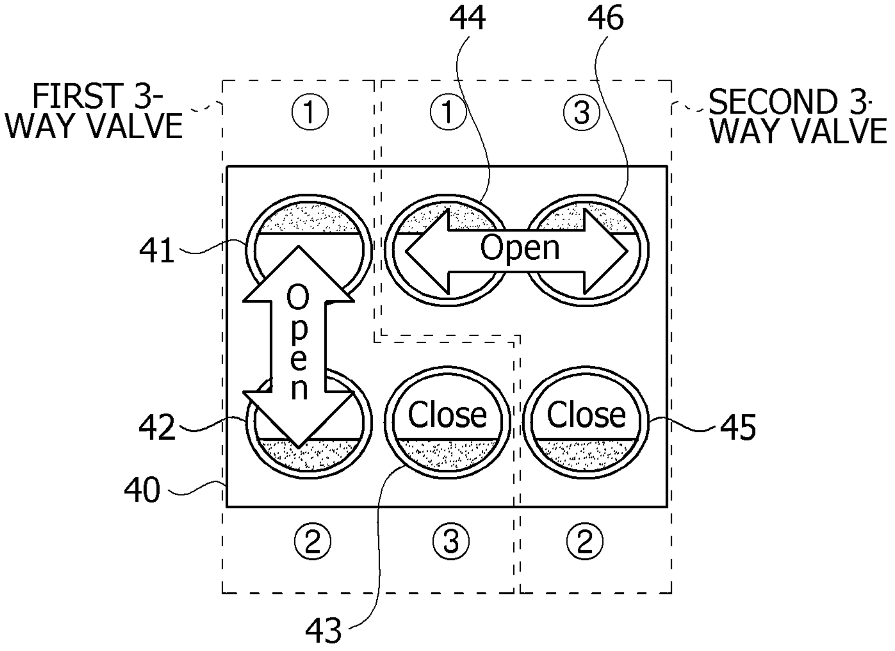
Figure 7:
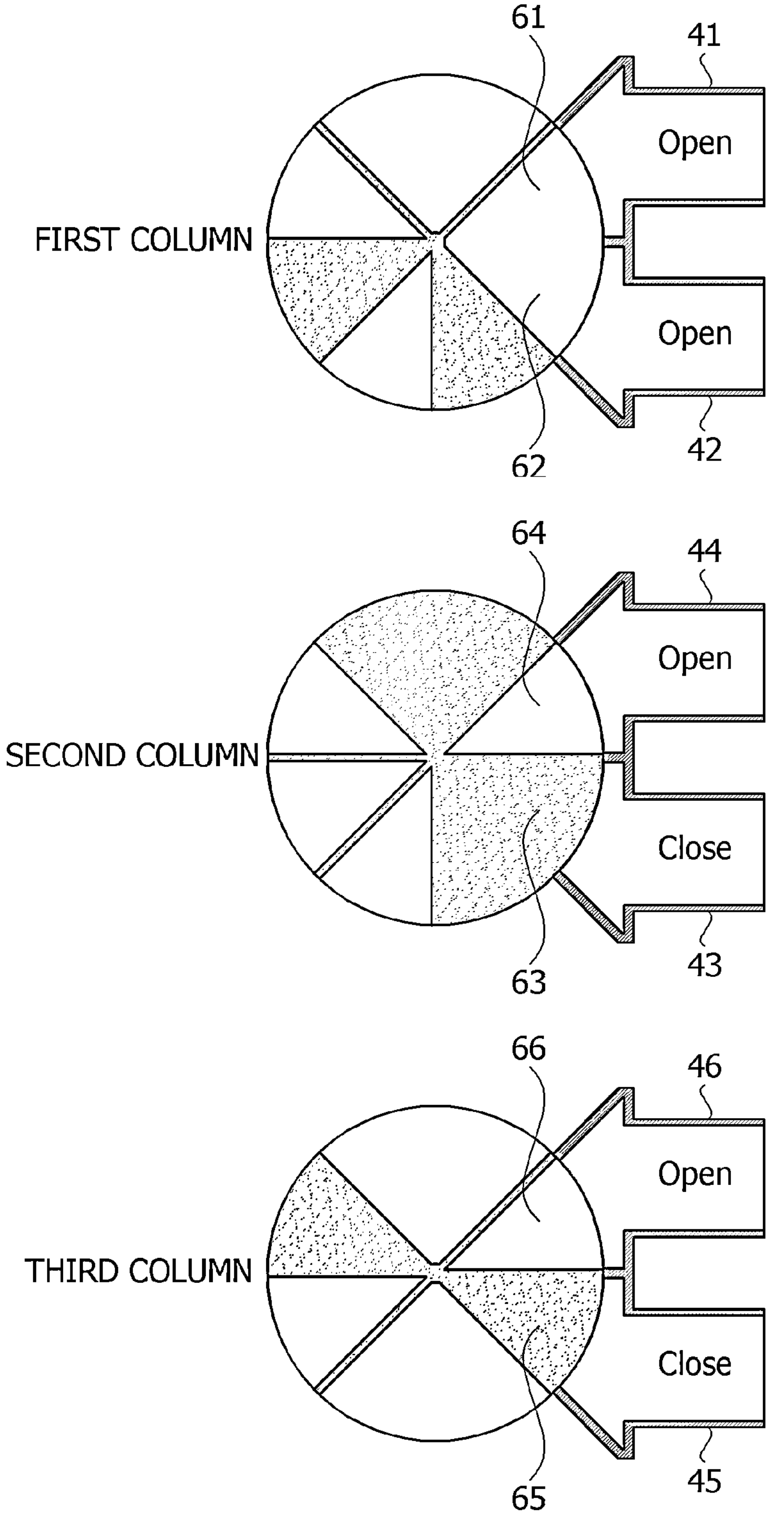
FIG. 7 is a view illustrating an open or closed state of the valve in the second mode according to one embodiment of the present invention.

FIG. 6 shows a bottom view (see FIG. 6A) illustrating the rotor in the second mode and a plan view (see FIG. 6B) illustrating the port unit in the second mode according to one embodiment of the present invention, and FIG. 7 is a view illustrating an open or closed state of the valve in the second mode according to one embodiment of the present invention.

Referring to FIG. 6, when the rotor 30 rotates 90° in one direction from the first mode, the rotor 30 operates in the second mode. In the second mode, a region constituting a first 3-way valve and a region constituting a second 3-way valve are the same as those in the first mode, this will be the same in a third mode and a fourth mode below. The unit compartments of the rotor 30 in the second mode are provided with a 2-1 compartment 61, a 2-2 compartment 62, a 2-3 compartment 63, a 2-4 compartment 64, a 2-5 compartment 65, and a 2-6 compartment 66.

In the second mode, the 2-1 to 2-3 compartments 61 to 63 and the first to third ports 41 to 43 operates together as the first 3-way valve, and the 2-4 to 2-6 compartments 64 to 66 and the fourth to sixth ports 44 to 46 operate together as the second 3-way valve.

In second mode in which the 2-1 compartment 61, the 2-2 compartment 62, and the 2-3 compartment 63 operate as the first 3-way valve, the 2-1 compartment 61 and the 2-2 compartment 62 are formed to be open, and the 2-3 compartment 63 is formed to be closed. Accordingly, in the first mode, the 2-1 compartment 61 and the 2-2 compartment 62 communicate with the first port 41 and the second port 42 to open the first 3-way valve.

Meanwhile, in the second mode in which the 2-4 compartment 64, the 2-6 compartment 66, and the 2-5 compartment 65 operate as the second 3-way, the 2-4 compartment 64 and the 2-6 compartment 66 are formed to be open, and the 2-5 compartment 65 is formed to be closed. Accordingly, in the second mode, the 2-4 compartment 64 and the 2-6 compartment 66 communicate with the fourth port 44 and the sixth port 46 to open the second 3-way valve.

In other words, as illustrated in FIG. 7, the compartment 51 and the 1-2 compartment 52 disposed in the first column are open, the 1-3 compartment 53 disposed in the second column is closed, the 1-4 compartment 54 disposed in the second column is open, the 1-5 compartment 55 disposed in the third column is open, and the 1-6 compartment 56 disposed in the third column is closed.

3. Third Mode

Figure 8:
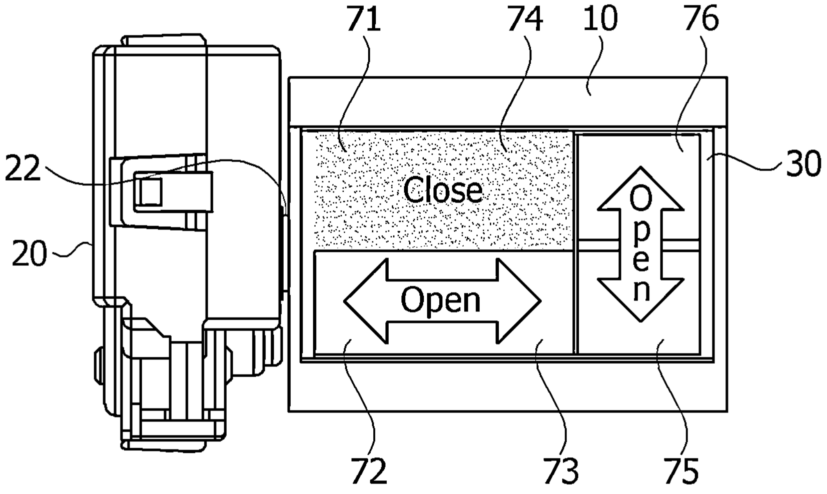
FIG. 8 shows a bottom view (see FIG. 8A) illustrating the rotor in the third mode and a plan view (see FIG. 8B) illustrating the port unit in the third mode according to one embodiment of the present invention.
Figure 8:
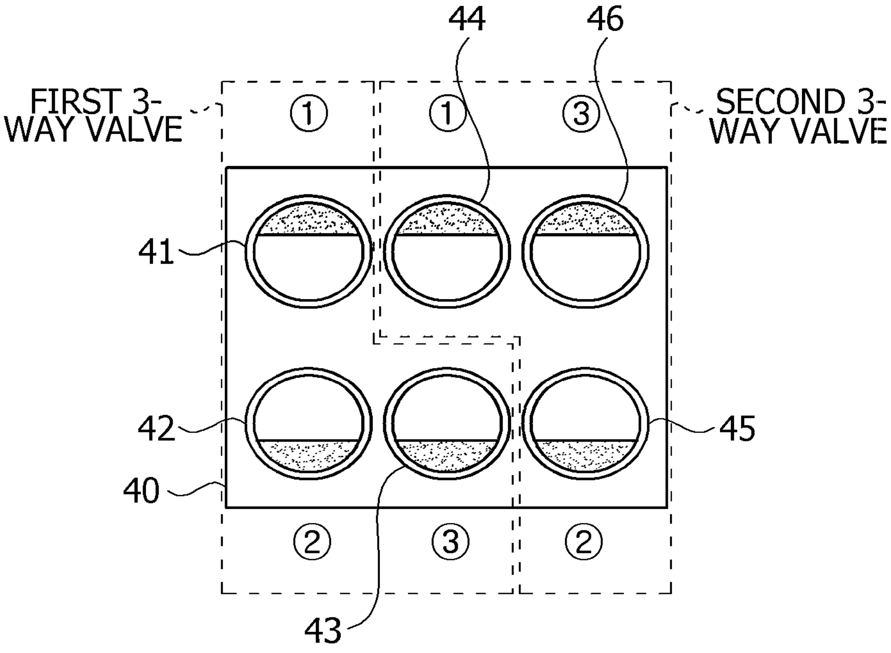
Figure 9:
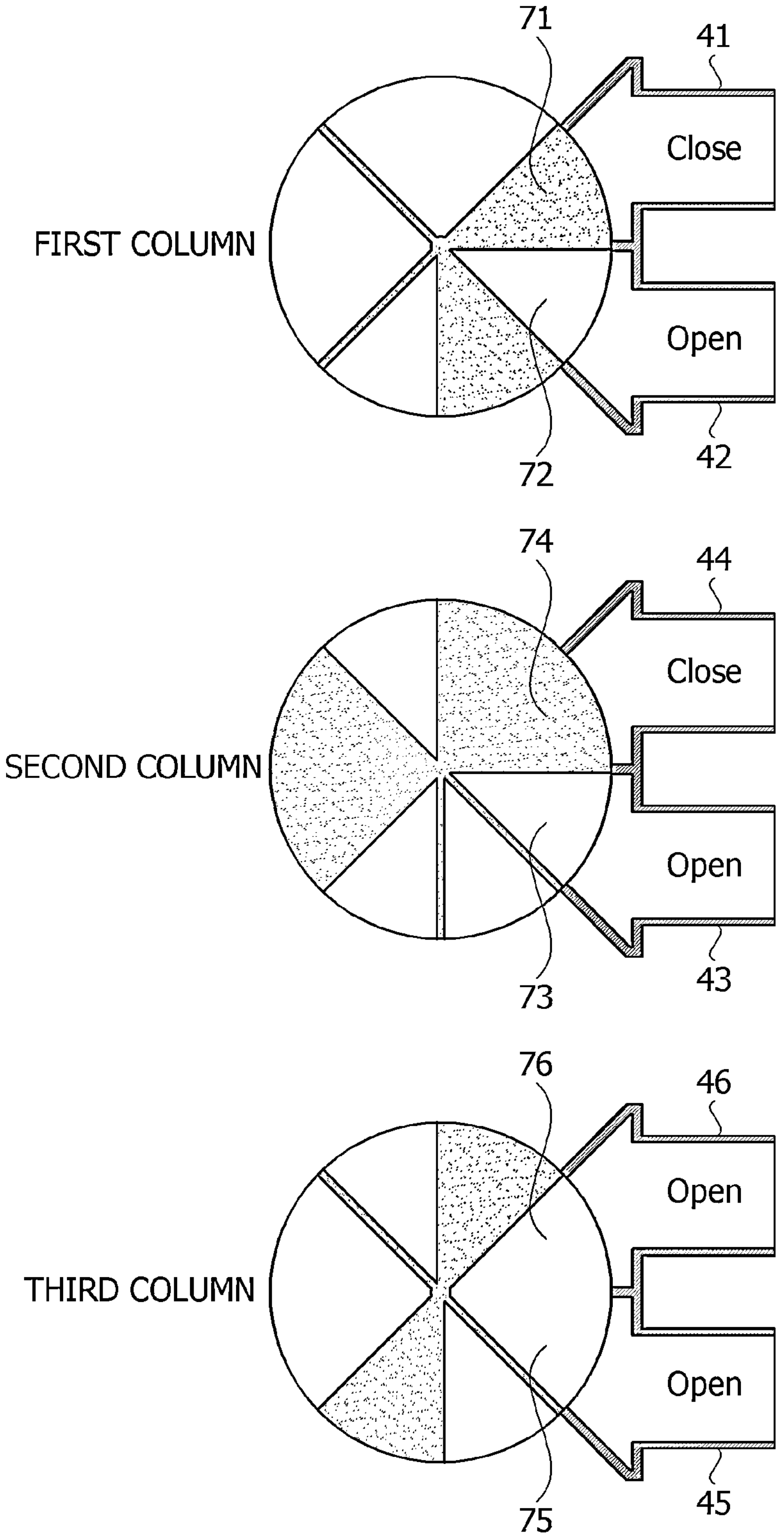
FIG. 9 is a view illustrating an open or closed state of the valve in the third mode according to one embodiment of the present invention.

FIG. 8 shows a bottom view (see FIG. 8A) illustrating the rotor in the third mode and a plan view (see FIG. 8B) illustrating the port unit in the third mode according to one embodiment of the present invention, and FIG. 9 is a view illustrating an open or closed state of the valve in the third mode according to one embodiment of the present invention.

Referring to FIG. 8, when the rotor 30 rotates 90° in one direction from the second mode, and the rotor 30 operates in the third mode. In the third mode, the unit compartments of the rotor 30 are provided with a 3-1 compartment 71, a 3-2 compartment 72, a 3-3 compartment 73, a 3-4 compartment 74, a 3-5 compartment 75, and a 3-6 compartment 76.

In the third mode, the 3-1 to 3-3 compartments 71 to 73 and the first to third ports 41 to 43 operate together as a first 3-way valve, and the 3-4 to 3-6 compartments 74 to 76 and the fourth to sixth ports 44 to 46 operate together as a second 3-way valve.

In the third mode, in which the 3-1 compartment 71, the 3-2 compartment 72, and the 3-3 compartment 73 operate as the first 3-way valve, the 3-1 compartment 71 is formed to be closed, and the 3-2 compartment 72 and the 3-3 compartment 73 are formed to be open. Accordingly, in the third mode, the 3-2 compartment 72 and the 3-3 compartment 73 communicate with the second port 42 and the third port 43 to open the first 3-way valve.

Meanwhile, in the third mode in which the 3-4 compartment 74, the 3-5 compartment 75, and the 3-6 compartment 7 operate as the second 3-way valve, the 3-4 compartment 74 is formed to be closed, and the 3-5 compartment 75 and the 3-6 compartment 76 are formed to be open. Accordingly, in the third mode, the 3-5 compartment 75 and the 3-6 compartment 76 communicate with the fifth port 45 and the sixth port 46 to open the second 3-way valve.

In other words, as illustrated in FIG. 9, the 3-1 compartment 71 disposed in the first column is closed, the 3-2 compartment 72 disposed in the first column is open, the 3-3 compartment 73 disposed in the second column is open, the 3-4 compartment 74 disposed in the second column is closed, and the 3-5 compartment 75 and the 3-6 compartment 76 disposed in the third column are open.

4. Fourth Mode

Figure 10:
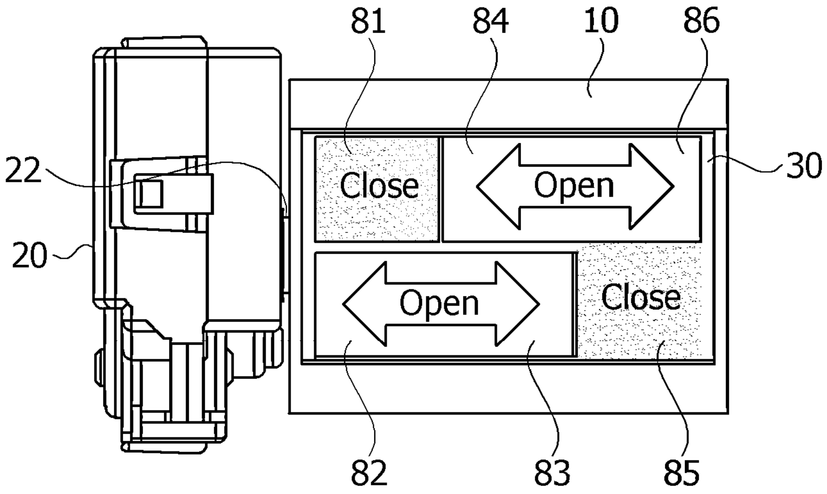
FIG. 10 shows a bottom view (see FIG. 10A) illustrating the rotor in the fourth mode and a plan view (see FIG. 10B) illustrating the port unit in the fourth mode according to one embodiment of the present invention.
Figure 10:
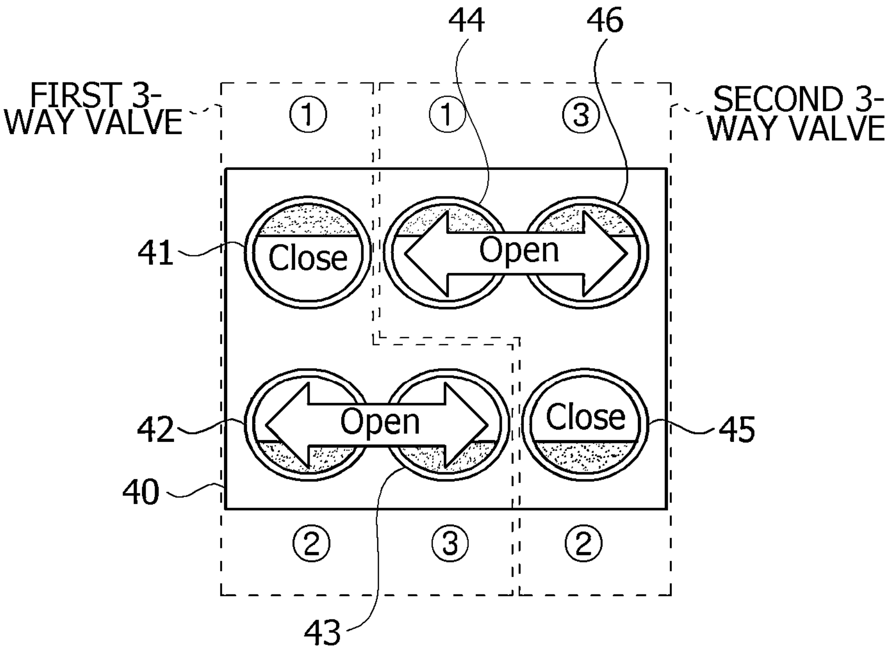
Figure 11:
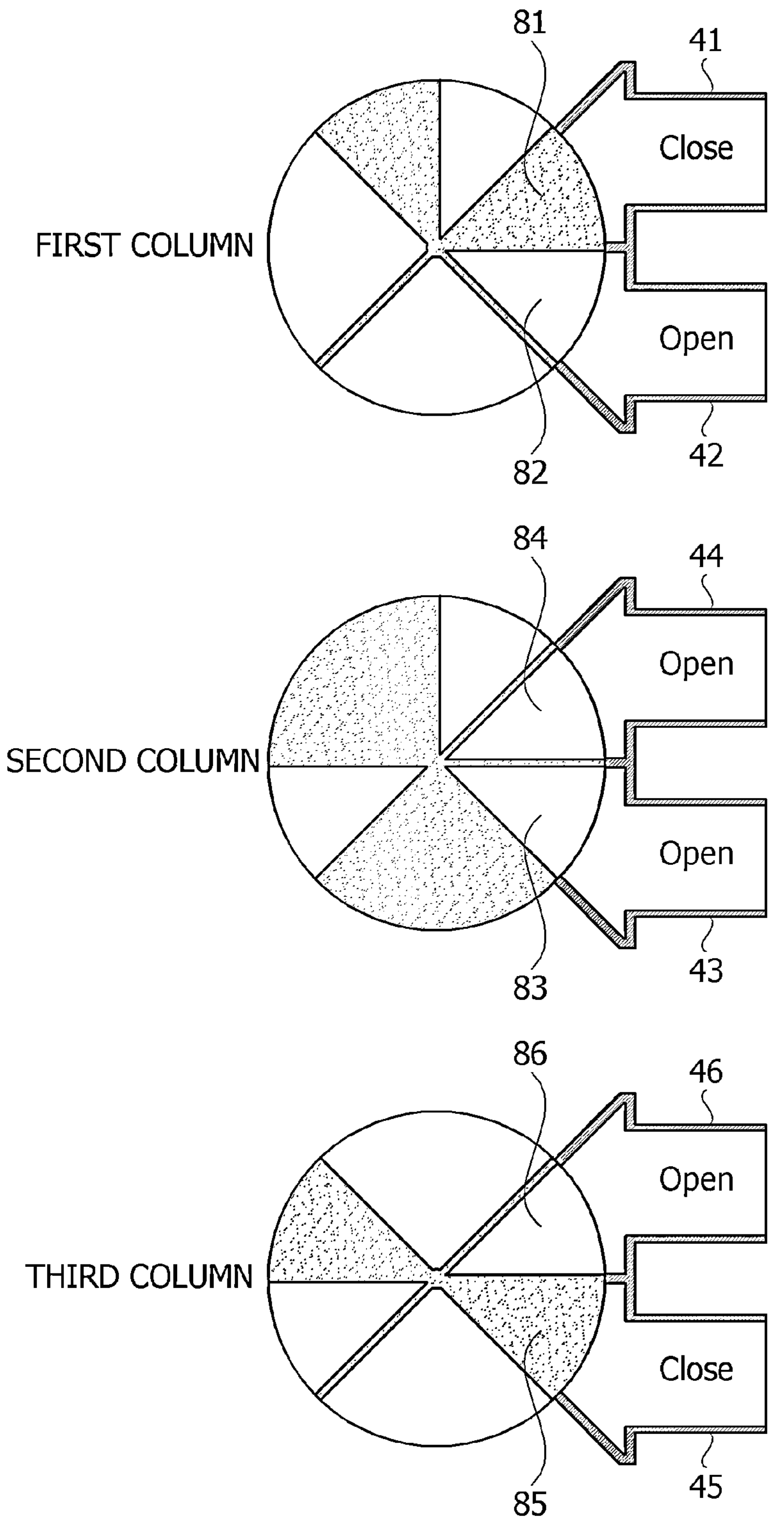
FIG. 11 is a view illustrating an open or closed state of the valve in the fourth mode according to one embodiment of the present invention.

FIG. 10 shows a bottom view (see FIG. 10A) illustrating the rotor in the fourth mode and a plan view (see FIG. 10B) illustrating the port unit in the fourth mode according to one embodiment of the present invention, and FIG. 11 is a view illustrating an open or closed state of the valve in the fourth mode according to one embodiment of the present invention.

Referring to FIG. 10, when the rotor 30 rotates 90° in one direction from the third mode, the rotor 30 operates in the fourth mode. In the fourth mode, the unit compartments of the rotor 30 are provided with a 4-1 compartment 81, a 4-2 compartment 82, a 4-3 compartment 83, a 4-4 compartment 84, a 4-5 compartment 85, and a 4-6 compartment 86.

In the fourth mode, the 4-1 to 4-3 compartments 81 to 83 and the first to third ports 41 to 43 operate together as a first 3-way valve, and the 4-4 to 4-6 compartments 84 to 86 and the fourth to sixth ports 44 to 46 operate together as a second 3-way valve.

In the fourth mode in which the 4-1 compartment 81, the 4-2 compartment 82, and the 4-3 compartment 83 operate as the first 3-way valve, the 4-1 compartment 81 is formed to be closed, and the 4-2 compartment 82 and the 4-3 compartment 83 are formed to be open. Accordingly, in the third mode, the 4-2 compartment 82 and the 4-3 compartment 83 communicate with the second port 42 and the third port 43 to open the first 3-way valve.

Meanwhile, in the fourth mode in which the 4-4 compartment 84, the 4-5 compartment 85, and the 4-6 compartment 86 operate as the second 3-way valve, the 4-4 compartment 84 and the 4-6 compartment 86 are formed to be open, and the 4-5 compartment 85 is formed to be closed. Accordingly, in the fourth mode, the 4-4 compartment 84 and the 4-6 compartment 86 communicate with the fourth port 44 and the sixth port 46 to open the second 3-way valve.

In other words, as illustrated in FIG. 11, the 4-1 compartment 81 disposed in the first column is closed, the 4-2 compartment 82 disposed in the first column is open, the 4-3 compartment 83 and the 4-4 compartment 84 disposed in the second column are open, the 4-5 compartment 85 disposed in the third column is closed, and the 4-6 compartment 86 disposed in the third column is open.

The ports 41 to 46 constituting the port unit 40 may be provided as inlet and outlet ports of a fluid for cooling a specific component. For example, the first port 41 and the second port 42 may be provided as an inlet port and an outlet port of a fluid for cooling a heater, respectively, the fourth port 44 and the third port 43 may be provided as an inlet port and an outlet port of a fluid for cooling a radiator, respectively, and the fifth port 45 and the sixth port 46 may be provided as an inlet port and an outlet port of a fluid for cooling a battery, respectively. However, examples of the components described above may be differently configured. That is, the components, the inlet ports, and the outlet ports may be changed according to a circuit of a system to which the valve assembly is applied.

Hereinafter, a fluid control valve assembly according to another embodiment of the present invention will be described below.

Figure 12:
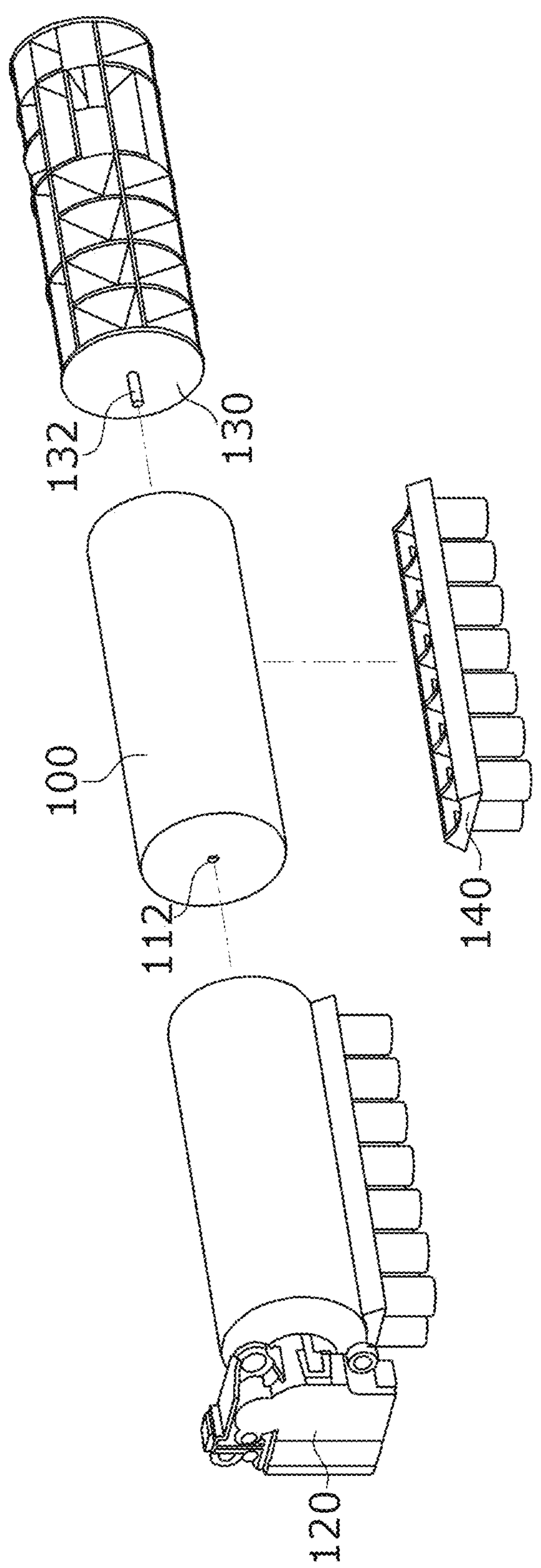
FIG. 12 is an exploded perspective view illustrating a fluid control valve assembly according to another embodiment of the present invention.
Figure 13:
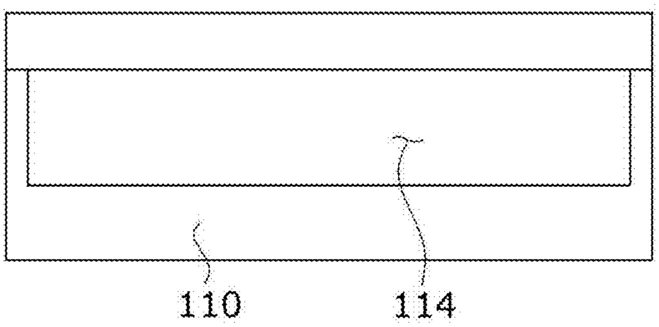
FIG. 13 is a bottom view illustrating a housing constituting the fluid control valve assembly.
Figure 14:
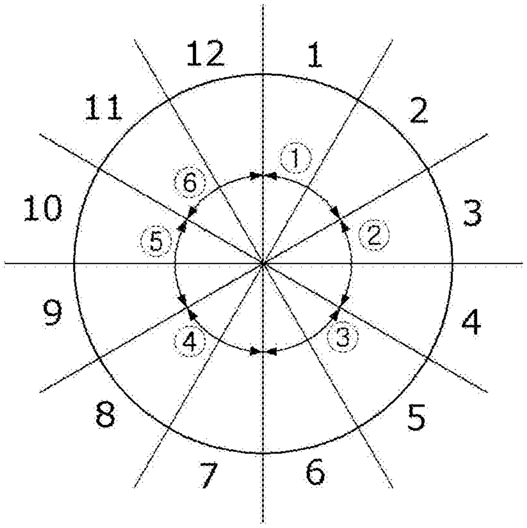
FIG. 14 is a schematic view illustrating first to sixth modes according to a shape of a rotor.

FIG. 12 is an exploded perspective view illustrating the fluid control valve assembly according to another embodiment of the present invention, FIG. 13 is a bottom view illustrating a housing constituting the fluid control valve assembly, and FIG. 14 is a schematic view illustrating first to sixth modes according to a shape of a rotor.

According to the drawings, the fluid control valve assembly according to another embodiment of the present invention may include a housing 110, an actuator 120 for providing power coupled to one side of the housing 110, a rotor 130 rotatably installed in the housing 110 and receiving the power from the actuator 120, and a port unit 140 coupled to one side of the housing 110 and connected to fluid hoses, and the rotor 130 may be formed to be divided to control two or more multi-way valves including different numbers (n) of n-way valves.

The housing 110 may be formed in a cylindrical shape having a predetermined volume in which the rotor 130 is rotatably installed. A shaft hole 112 through which a rotor shaft 132 of the rotor 130 passes is formed in the housing 110. The shaft hole 112 is formed in a rotation axis direction of the housing 110. In addition, as illustrated in FIG. 2, an opening portion 14 is formed in a portion of a lower surface of the housing 110, and unit compartments of the rotor 130 may communicate with the port unit 140 through the opening portion 14.

The actuator 120 is installed in an axial direction of the housing 110 and serves as a power source which transmits power to the rotor 130. In the actuator 120, a driving shaft 122 extends in one direction, and the driving shaft 122 is coupled to the rotor shaft 132 to transmit the power to the rotor 130.

The rotor 130 may be formed in a cylindrical shape to be accommodated in the housing 110. The rotor shaft 132 is provided in the rotor 130 in an axial direction, and the rotor shaft 132 passes through the shaft hole 112 and protrudes to be coupled to the driving shaft 122. Accordingly, when the actuator 120 is driven, the rotor 130 receives the power through the driving shaft 122 and rotates at a predetermined angle to control opening or closing of valves.

Referring to FIG. 14, the rotor 130 may be divided into a plurality of compartments in the axial direction and a rotation direction to form the unit compartments, and at least some of the unit compartments may be formed to communicate with each other. In the present embodiment, the unit compartments are divided into seven rooms in the axial direction and 112 rooms in the rotation direction to form a total of 184 rooms. Among them, some compartments are completely open to serve to open valves, and the rest are completely closed to serve to close valves.

In other words, the unit compartments are provided to open a portion of the rotor 130 having the cylindrical shape, that is, are formed as spacers so that, as the rotor 130 rotates at a predetermined angle, some spacers communicate with each other to open valves. In addition, some of the unit compartments are provided to be closed, that is, are formed in fully filled shapes, so that valves are closed.

Since the rotor 130 are divided into a total of 112 rooms in the rotation direction, each room has a central angle of 130°. In addition, one mode may be defined and operated by two divided regions. In other words, a first mode to a sixth mode may be defined by a central angle of 60° in a circumferential direction of the rotor 130, and when the rotor 130 is driven in six modes, multi-way valves including different numbers (n) of n-way valves may be integrated and driven like a single valve. For example, a plurality of 3-way valves and a plurality of 4-way valves may be integrally operated like a single valve.

Referring to FIG. 112 again, the port unit 140 is coupled to a lower portion of the housing 110. The port unit 140 is provided with a plurality of ports 141 to 154 connected to the fluid hoses and components. The ports 141 to 154 are formed to extend perpendicular to the axial direction of the rotor 130.

Figure 15:
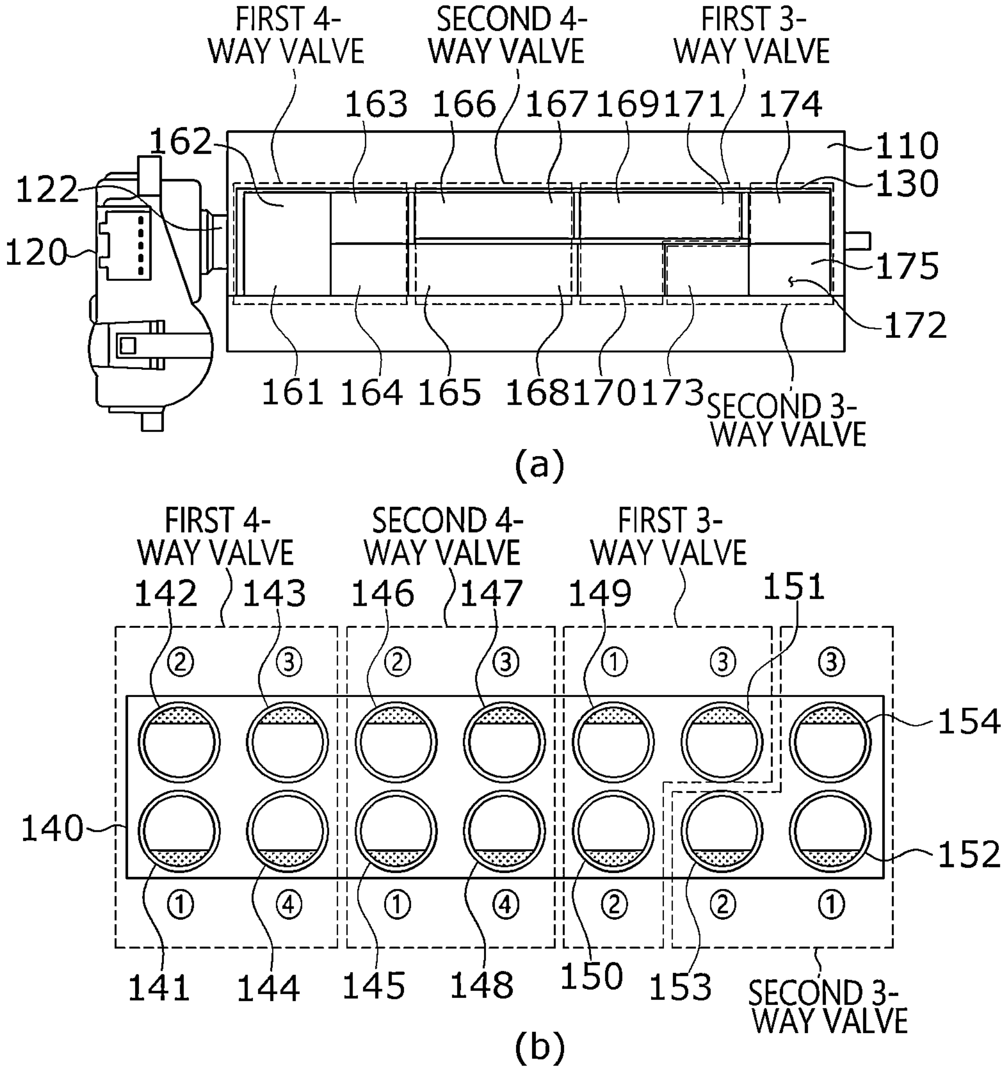
FIG. 15 shows a bottom view (see FIG. 15A) illustrating a rotor in the first mode and a plan view (see FIG. 15B) illustrating a port unit in the first mode according to another embodiment of the present invention.

FIG. 15 shows a bottom view (see FIG. 15A) illustrating a rotor in the first mode and a plan view (see FIG. 15B) illustrating the port unit in the first mode according to another embodiment of the present invention.

Referring to the drawings, in the first mode, the unit compartments of the rotor 130 are provided with a 1-1 compartment 161, a 1-2 compartment 162, a 1-3 compartment 163, a 1-4 compartment 164, a 1-5 compartment 165, a 1-6 compartment 166, a 1-7 compartment 167, a 1-8 compartment 168, a 1-9 compartment 169, a 1-10 compartment 170, a 1-11 compartment 171, a 1-12 compartment 172, a 1-13 compartment 173, and a 1-14 compartment 174. The 1-1 to 1-14 compartments 161 to 174 are divided regions each having a central angle of 60° in the rotation direction of the rotor 130, and are provided with a total of 14 compartments.

In the present embodiment, in a bottom view, the 1-1 to 1-4 compartments 161 to 164 are driven as a first 4-way valve, the 1-5 to 1-8 compartments 165 to 168 are driven as a second 4-way valve, the 1-9 to 1-11 compartments 169 to 171 are driven as a first 3-way valve, and the 1-12 to 1-14 compartments 172 to 174 are driven as a second 3-way valve. That is, eight compartments are formed to drive two 4-way valves each formed with four compartments, and six compartments are formed to drive two 3-way valves each formed with three compartments.

In a bottom view, the 1-1 compartment 161 is disposed in a second row and a first column, the 1-2 compartment 162 is disposed in a first row and the first column, the 1-3 compartment 163 is disposed in the first row and a second column, the 1-4 compartment 164 is disposed in the second row and the second column, the 1-5 compartment 165 is disposed in the second row and a third column, the 1-6 compartment 166 is disposed in the first row and the third column, the 1-7 compartment 167 is disposed in the first row and a fourth column, the 1-8 compartment 168 is disposed in the second row and the fourth column, the 1-9 compartment 169 is disposed in the first row and a fifth column, the 1-10 compartment 170 is disposed in the second row and the fifth column, the 1-11 compartment 171 is disposed in the first row and a sixth column, the 1-12 compartment 172 is disposed in the second row and a seventh column, the 1-13 compartment 173 is disposed in the second row and the sixth column, and the 1-14 compartment 174 is disposed in the first row and the seventh column.

In addition, the ports 141 to 154 are disposed at locations corresponding to the 1-1 to 1-14 compartments 161 to 174. In a plan view, a first port 141 is disposed in the second row and the first column, a second port 142 is disposed in the first row and the first column, a third port 143 is disposed in the first row and the second column, a fourth port 144 is disposed in the second row and the second column, a fifth port 145 is disposed in the second row and the third column, a sixth port 146 is disposed in the first row and the third column, a seventh port 147 is disposed in the first row and the fourth column, an eighth port 148 is disposed in the second row and the fourth column, a ninth port 149 is disposed in the first row and the fifth column, a 110$^{th}$ port 150 is disposed in the second row and the fifth column, an 11$^{th}$ port 151 is disposed in the first row and the sixth column, a 112$^{th}$ port 152 is disposed in the second row and the seventh column, a 13$^{th}$ port 153 is disposed in the second row and the sixth column, and a 14$^{th}$ port 154 is disposed in the first row and the seventh column.

In summary, the 1-1 to 1-4 compartments 161 to 164 and the first to fourth ports 141 to 144 operate together as the first 4-way valve, the 1-5 to 1-8 compartments 165 to 168 and the fifth to eighth ports 145 to 148 operate together as the second 4-way valve, the 1-9 to 1-11 compartments 169 to 171 and the ninth to 11$^{th}$ ports 149 to 151 operate together as the first 3-way valve, and the 1-12 to 1-14 compartment 172 to 174 and the 112$^{th}$ to 14$^{th}$ ports 152 to 154 operate together as the second 3-way valve.

In the present embodiment, since two or more multi-way valves including different numbers (n) of n-way valves may be integrated as a single valve assembly and one actuator 120 may drive two or more valves, a structure can be simple, and component costs can be reduced. Hereinafter, an example of a structure in which four valves (two 3-way valves and two 4-way valves) are integrated will be described, but the present invention is not limited thereto, and in a valve assembly, five or more valves may be integrally driven. According to the present embodiment, the valve assembly may be driven in a total of six modes, which will be described in detail below.

1. First Mode

Figure 16:
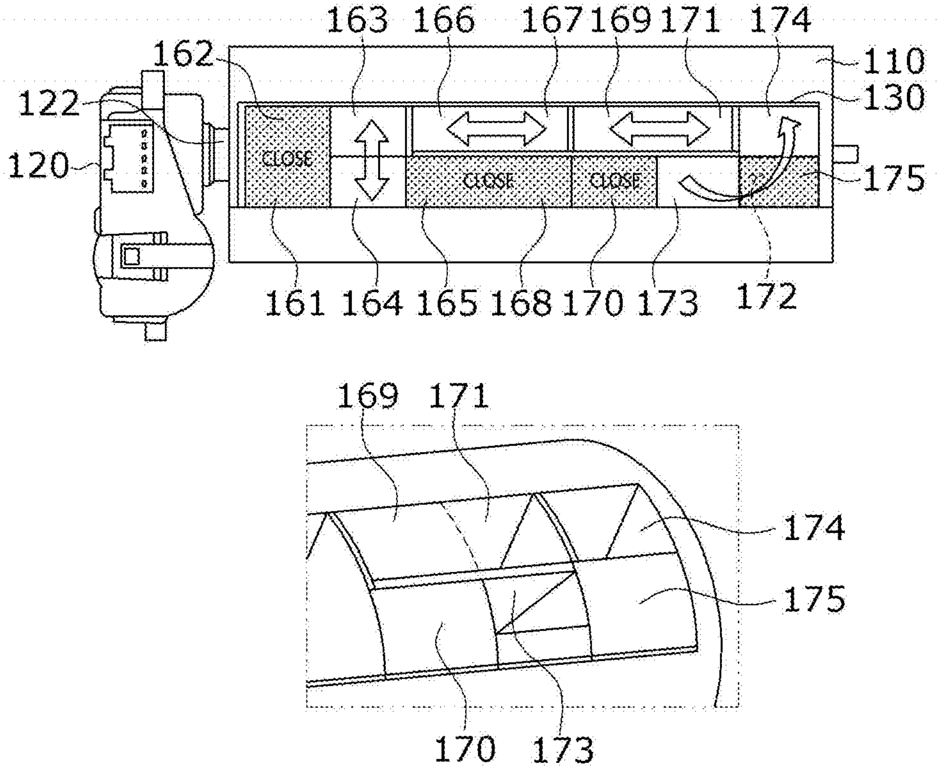
FIG. 16 is a bottom view illustrating the rotor in the first mode according to another embodiment of the present invention.
Figure 17:
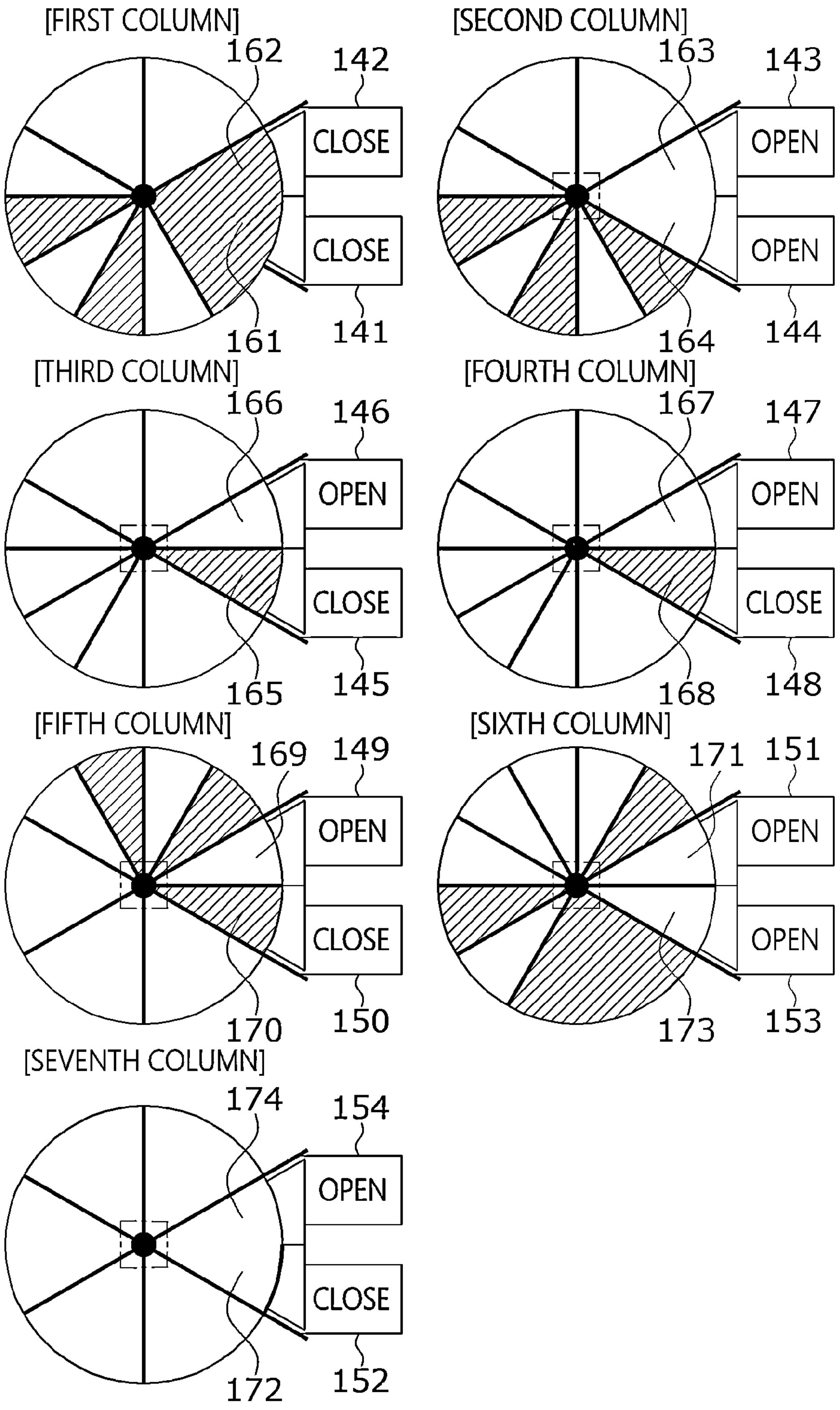
FIG. 17 is a view illustrating an open or closed state of a valve in the first mode according to another embodiment of the present invention.

FIG. 16 is a bottom view illustrating the rotor in the first mode according to another embodiment of the present invention, and FIG. 17 is a view illustrating an open or closed state of a valve in the first mode according to another embodiment of the present invention.

Referring to FIG. 16, in the first mode in which the 1-1 compartment 161, the 1-2 compartment 162, the 1-3 compartment 163, and the 1-4 compartment 164 operate as the first 4-way valve, the 1-1 compartment 161 and the 1-2 compartment 162 are formed to be closed, and the 1-3 compartment 163 and the 1-4 compartment 164 are formed to be open. Accordingly, in the first mode, the 1-3 compartment 163 and the 1-4 compartment 164 communicate with the third port 143 and the fourth port 144 to open the first 4-way valve.

In the first mode in which the 1-5 compartment 165, the 1-8 compartment 168, the 1-6 compartment 166, and the 1-7 compartment 167 operate as the second 4-way valve, the 1-5 compartment 165 and the 1-8 compartment 168 are formed to be closed, and the 1-6 compartment 166 and the 1-7 compartment 167 are formed to be open. Accordingly, in the first mode, the 1-6 compartment 166 and the 1-7 compartment 167 communicate with the sixth port 146 and the seventh port 147 to open the second 4-way valve.

Meanwhile, in the first mode in which the 1-9 compartment 169, the 1-11 compartment 171, and the 1-10 compartment 170 operate as the first 3-way valve, the 1-9 compartment 169 and the 1-11 compartment 171 are formed to be open, and the 1-10 compartment 170 is formed to be closed. Accordingly, in the first mode, the 1-9 compartment 169 and the 1-11 compartment 171 communicate with the ninth port 149 and the 11$^{th}$ port 151 to open the first 3-way valve.

The 1-12 compartment 172, the 1-13 compartment 173, and the 1-14 compartment 174 which operate as the second 3-way valve in the first mode are formed to be open. However, as illustrated in FIG. 16, a first opening cover 175 is provided on an outer side of the 1-12 compartment 172. The first opening cover 175 is a portion actually forming an outer surface of the rotor 130, and since the first opening cover 175 blocks the 1-12 compartment 172 from the outside, the 12$^{th}$ port 152 does not communicate with the 1-12 compartment 172.

Ultimately, the 1-13 compartment 173 and the 1-14 compartment 174 communicate with the 13$^{th}$ port 153 and the 14$^{th}$ port 154 to open the second 3-way valve. In this case, since the 1-13 compartment 173 and the 1-14 compartment 174 are located in diagonal directions, the 1-13 compartment 173 and the 1-14 compartment 174 communicate through the 1-12 compartment 172 without communicating directly.

In other words, as illustrated in FIG. 17, the 1-1 compartment 161 and the 1-2 compartment 162 disposed in the first column are closed, the 1-3 compartment 163 and the 1-4 compartment 164 disposed in the second column are open, the 1-5 compartment 165 disposed in the third column is closed, the 1-6 compartment 166 disposed in the third column is open, the 1-7 compartment 167 disposed in the fourth column is open, the 1-8 compartment 168 disposed in the fourth column is closed, the 1-9 compartment 169 disposed in the fifth column is open, the 1-10 compartment 170 disposed in the fifth column is closed, the 1-11 compartment 171 and the 1-13 compartment 173 disposed in the sixth column are open, the 1-12 compartment 172 disposed in the seventh column is closed by the first opening cover 175, and the 1-14 compartment 174 disposed in the seventh column is open.

2. Second Mode

Figure 18:
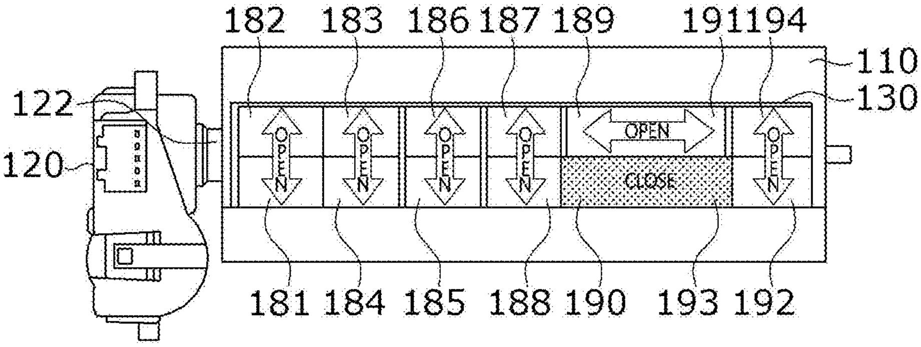
FIG. 18 is a bottom view illustrating the rotor in the second mode according to another embodiment of the present invention.
Figure 19:
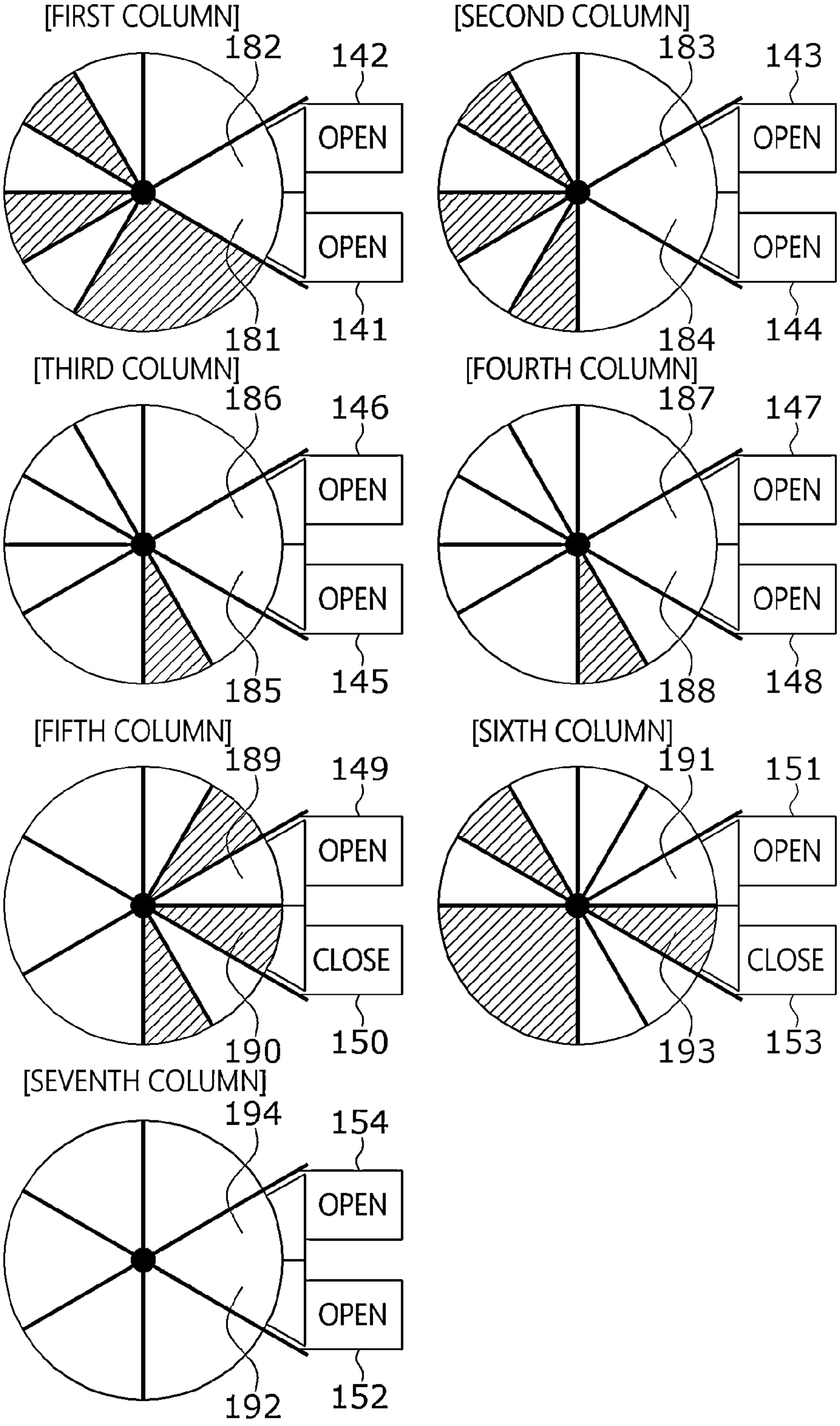
FIG. 19 is a view illustrating an open or closed state of the valve in the second mode according to another embodiment of the present invention.
Figure 20:
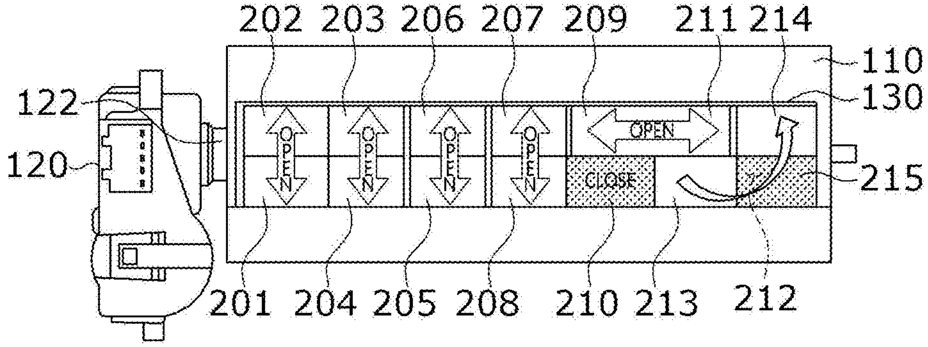
FIG. 20 is a bottom view illustrating the rotor in the third mode according to another embodiment of the present invention.
Figure 21:
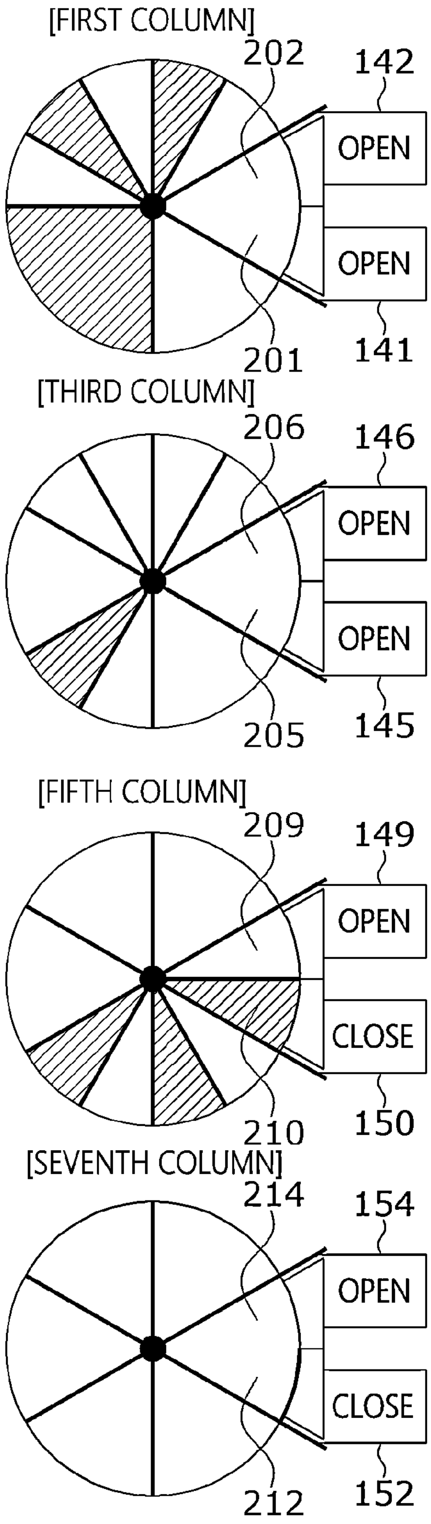
FIG. 21 is a view illustrating an open or closed state of the valve in the third mode according to another embodiment of the present invention.
Figure 22:
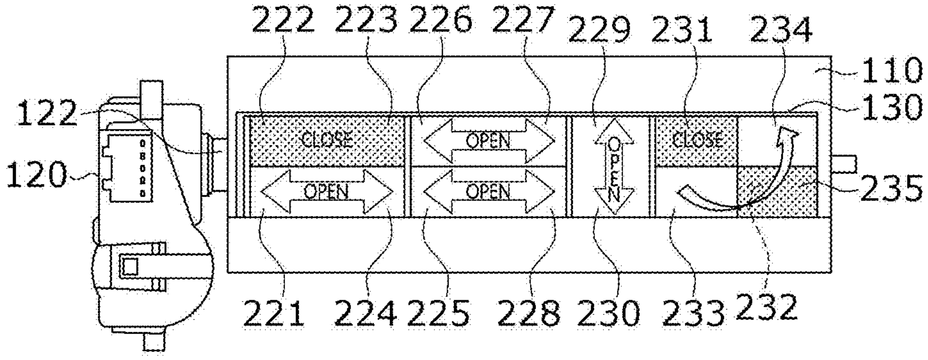
FIG. 22 is a bottom view illustrating the rotor in the fourth mode according to another embodiment of the present invention.
Figure 23:
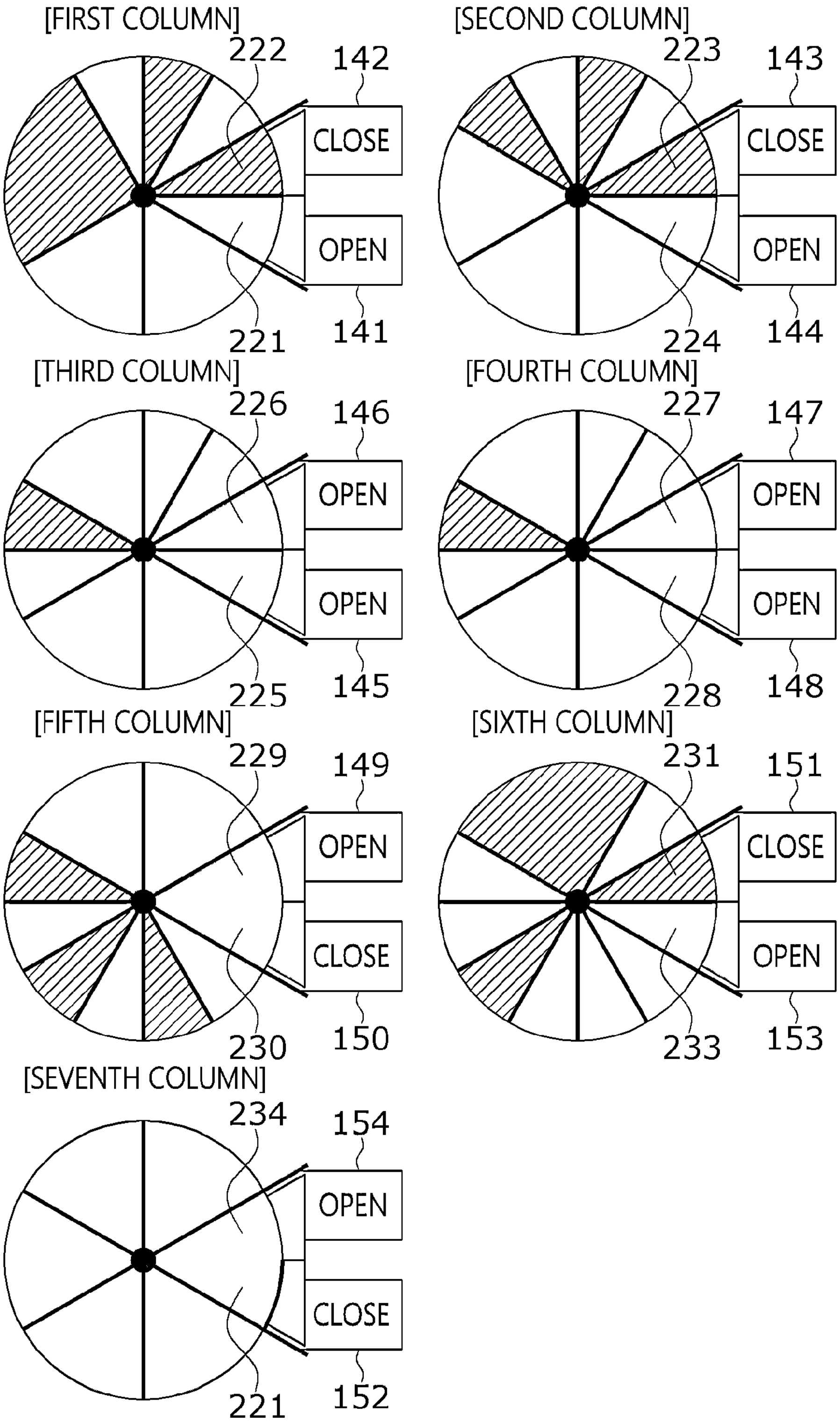
FIG. 23 is a view illustrating an open or closed state of the valve in the fourth mode according to another embodiment of the present invention.
Figure 24:
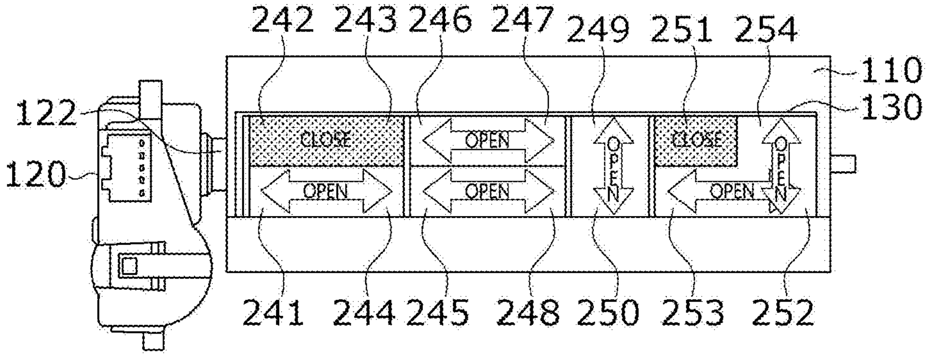
FIG. 24 is a bottom view illustrating the rotor in the fifth mode according to another embodiment of the present invention.
Figure 25:
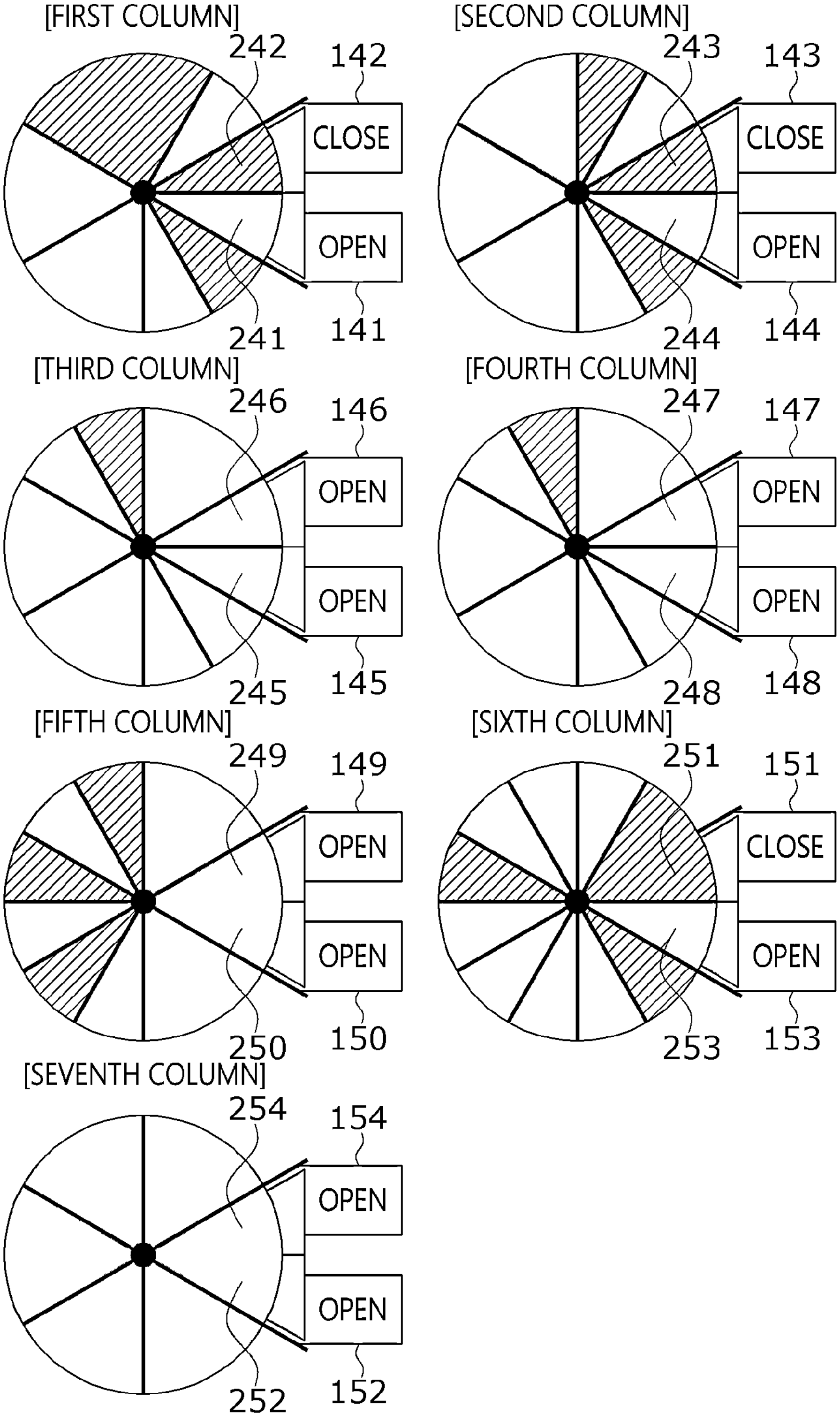
FIG. 25 is a view illustrating an open or closed state of the valve in the fifth mode according to another embodiment of the present invention.
Figure 26:
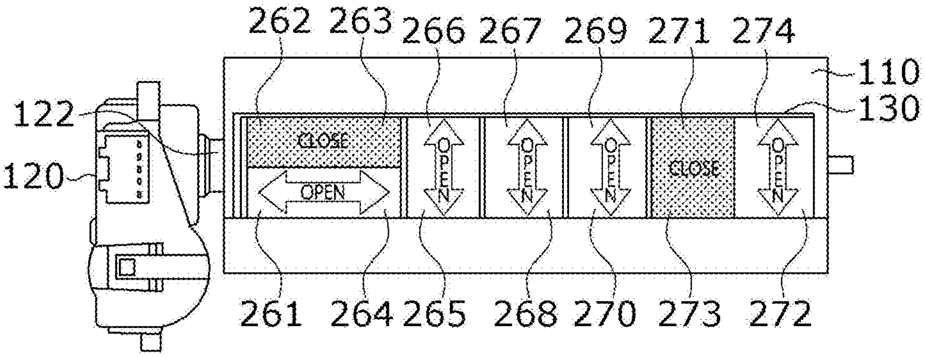
FIG. 26 is a bottom view illustrating the rotor in the sixth mode according to another embodiment of the present invention.

FIG. 18 is a bottom view illustrating the rotor in the second mode according to another embodiment of the present invention, and FIG. 19 is a view illustrating an open or closed state of the valve in the second mode according to another embodiment of the present invention.

Referring to FIG. 18, when the rotor 130 rotates 60° in one direction from the first mode, the rotor 130 operates in the second mode. In the second mode, regions constituting first and second 4-way valves and regions constituting first and second 3-way valves are the same as those in the first mode, this will be the same in third to sixth modes below. In the second mode, the unit compartments of the rotor 130 are provided with a 2-1 compartment 181, a 2-2 compartment 182, a 2-3 compartment 183, a 2-4 compartment 184, a 2-5 compartment 185, a 2-6 compartment 186, a 2-7 compartment 187, a 2-8 compartment 188, a 2-9 compartment 189, a 2-10 compartment 190, a 2-11 compartment 191, a 2-12 compartment 192, a 2-13 compartment 193, and a 2-14 compartment 194.

In the second mode, the 2-1 to 2-4 compartments 181 to 184 and the first to fourth ports 141 to 144 operate together as the first 4-way valve, the 2-5 to 2-8 compartments 185 to 188 and the fifth to eighth ports 145 to 148 operate together as the second 4-way valve, the 2-9 to 2-11 compartments 189 to 191 and the ninth to 11$^{th}$ ports 149 to 151 operate together as the first 3-way valve, and the 2-12 to 2-14 compartments 192 to 194 and the 112$^{th}$ to 14$^{th}$ ports 152 to 154 operate together as the second 3-way valve.

The 2-1 compartment 181, the 2-2 compartment 182, the 2-3 compartment 183, and the 2-4 compartment 184 which operate as the first 4-way valve in the second mode are formed to be open. Accordingly, in the second mode, the 2-1 compartment 181 and the 2-2 compartment 182 communicate with the first port 141 and the second port 142 to open the first 4-way valve, and the 2-3 compartment 183 and the 2-4 compartment 184 communicate with the third port 143 and the fourth port 144 to open the first 4-way valve.

The 2-5 compartment 185, the 2-6 compartment 186, the 2-7 compartment 187, and the 2-8 compartment 188 which operate together as the second 4-way valve in the second mode are formed to be open. Accordingly, in the second mode, the 2-5 compartment 185 and the 2-6 compartment 186 communicate with the fifth port 145 and the sixth port 146 to open the second 4-way valve, and the 2-7 compartment 187 and the 2-8 compartment 188 communicate with the seventh port 147 and the eighth port 148 to open the second 4-way valve.

Meanwhile, in the second mode in which the 2-9 compartment 189, the 2-11 compartment 191, and the 2-10 compartment 190 operate as the first 3-way valve, the 2-9 compartment 189 and the 2-11 compartment 191 are formed to be open, and the 2-10 compartment 190 is formed to be closed. Accordingly, the 2-9 compartment 189 and the 2-11 compartment 191 communicate with the ninth port 149 and the 11$^{th}$ port 151 to open the first 3-way valve.

In the second mode in which the 2-12 compartment 192, the 2-14 compartment 194, and the 2-13 compartment 193 operate as the second 3-way valve, the 2-12 compartment 192 and the 2-14 compartment 194 are formed to be open, and the 2-13 compartment 193 is formed to be closed. Accordingly, the 2-12 compartment 192 and the 2-14 compartment 194 communicate with the 112$^{th}$ port 152 and the 14$^{th}$ port 154 to open the second 3-way valve.

In other words, as illustrated in FIG. 19, the 2-1 compartment 181 and the 2-2 compartment 182 disposed in the first column are open, the 2-3 compartment 183 and the 2-4 compartment 184 disposed in the second column are open, the 2-5 compartment 185 and the 2-6 compartment 186 disposed in the third column are open, the 2-7 compartment 187 and the 2-8 compartment 188 disposed in the fourth column are open, the 2-9 compartment 189 disposed in the fifth column is open, the 2-10 compartment 190 disposed in the fifth column is closed, the 2-11 compartment 191 disposed in the sixth column is open, the 2-13 compartment 193 disposed in the sixth column is closed, and the 2-12 compartment 192 and the 2-14 compartment 194 disposed in the seventh column are open.

3. Third Mode

FIG. 9 is a bottom view illustrating the rotor in the third mode according to one embodiment of the present invention, and FIG. 10 is a view illustrating an open or closed state of a valve in the third mode according to one embodiment of the present invention.

Referring to FIG. 9, when the rotor 130 rotates 60° in one direction from the second mode, the rotor 130 operates in the third mode. In the third mode, the unit compartments of the rotor 130 are provided with a 3-1 compartment 201, a 3-2 compartment 202, a 3-3 compartment 203, a 3-4 compartment 204, a 3-5 compartment 205, a 3-6 compartment 206, a 3-7 compartment 207, a 3-8 compartment 208, a 3-9 compartment 209, a 3-10 compartment 210, a 3-11 compartment 211, a 3-12 compartment 212, a 3-13 compartment 213, and a 3-14 compartment 214.

In the third mode, the 3-1 to 3-4 compartments 201 to 204 and the first to fourth ports 141 to 144 operate together as a first 4-way valve, and the 3-5 to 3-8 compartments 205 to 208 and the fifth to eighth ports 145 to 148 operate together as a second 4-way valve, the 3-9 to 3-11 compartments 209 to 211 and the ninth to $11^{th}$ ports 149 to 151 operate together as a first 3-way valve, and the 3-12 to 3-14 compartments 212 to 214 and the $12^{th}$ to $14^{th}$ ports 152 to 154 operate together as a second 3-way valve.

The 3-1 compartment 201, the 3-2 compartment 202, the 3-3 compartment 203, and the 3-4 compartment 204 which operate as the first 4-way valve in the third mode are formed to be open. Accordingly, in the third mode, the 3-1 compartment 201 and the 3-2 compartment 202 communicate with the first port 141 and the second port 142 to open the first 4-way valve, and the 3-3 compartment 203 and the 3-4 compartment 204 communicate with the third port 143 and the fourth port 144 to open the first 4-way valve.

The 3-5 compartment 205, the 3-6 compartment 206, the 3-7 compartment 207, and the 3-8 compartment 208 which operate as the second 4-way valve in the third mode are formed to be open. Accordingly, in the third mode, the 3-5 compartment 205 and the 3-6 compartment 206 communicate with the fifth port 145 and the sixth port 146 to open the second 4-way valve, and the 3-7 compartment 207 and the 3-8 compartment 208 communicate with the seventh port 147 and the eighth port 148 to open the second 4-way valve.

Meanwhile, in the third mode in which the 3-9 compartment 209, the 3-11 compartment 211, and the 3-10 compartment 210 operate as the first 3-way valve, the 3-9 compartment 209 and the 3-11 compartment 211 are formed to be open, and the 3-10 compartment 210 is formed to be closed. Accordingly, the 3-9 compartment 209 and the 3-11 compartment 211 communicate with the ninth port 149 and the $11^{th}$ port 151 to open the first 3-way valve.

The 3-12 compartment 212, the 3-13 compartment 213, the 3-14 compartment 214 which operate as the second 3-way valve in the third mode are formed to be open. However, a third opening cover 215 is provided on an outer side of the 3-12 compartment 212. The third opening cover 215 is a portion actually forming an outer surface of the rotor 130, and since the third opening cover 215 blocks the 3-12 compartment 212 from the outside, the $12^{th}$ port 152 does not communicate with the 3-12 compartment 212.

Ultimately, the 3-13 compartment 213 and the 3-14 compartment 214 communicate with the $13^{th}$ port 153 and the $14^{th}$ port 154 to open the second 3-way valve. In this case, since the 3-13 compartment 213 and the 3-14 compartment 214 are located in diagonal directions, the 3-13 compartment 213 and the 3-14 compartment 214 communicate through the 3-12 compartment 212 without communicating directly.

In other words, as illustrated in FIG. 10, the 3-1 compartment 201 and the 3-2 compartment 202 disposed in the first column are open, the 3-3 compartment 203 and the 3-4 compartment 204 disposed in the second column are open, the 3-5 compartment 205 and the 3-6 compartment 206 disposed in the third column are open, the 3-7 compartment 207 and the 3-8 compartment 208 disposed in the fourth column are open, the 3-9 compartment 209 disposed in the fifth column is open, the 3-10 compartment 210 disposed in the fifth column is closed, the 3-11 compartment 211 and the 3-13 compartment 213 disposed in the sixth column are open, the 3-12 compartment 212 disposed in the seventh column is closed by the third opening cover 215, and the 3-14 compartment 214 disposed in the seventh column is open.

4. Fourth Mode

FIG. 11 is a bottom view illustrating the rotor in the fourth mode according to one embodiment of the present invention, and FIG. 12 is a view illustrating an open or closed state of the valve in the fourth mode according to one embodiment of the present invention.

Referring to FIG. 11, when the rotor 130 rotates 60° in one direction from the third mode, the rotor operates in the fourth mode. In the fourth mode, the unit compartments of the rotor 130 are provided with a 4-1 compartment 221, a 4-2 compartment 222, a 4-3 compartment 223, a 4-4 compartment 224, a 4-5 compartment 225, a 4-6 compartment 226, a 4-7 compartment 227, a 4-8 compartment 228, a 4-9 compartment 229, a 4-10 compartment 230, a 4-11 compartment 231, a 4-12 compartment 232, a 4-13 compartment 233, and a 4-14 compartment 234.

In the fourth mode, the 4-1 to 4-4 compartments 221 to 224 and the first to fourth ports 141 to 144 operate together as the first 4-way valve, the 4-5 to 4-8 compartments 225 to 228 and the fifth to eighth ports 145 to 148 operate together as the second 4-way valve, the 4-9 to 4-11 compartments 229 to 231 and the ninth to $11^{th}$ ports 149 to 151 operate together as the first 3-way valve, and the 4-12 to 4-14 compartments 232 to 234 and the $12^{th}$ to $14^{th}$ ports 152 to 154 operate together as the second 3-way valve.

In the fourth mode in which the 4-1 compartment 221, the 4-4 compartment 224, the 4-2 compartment 222, and the 4-3 compartment 223 which operate as the first 4-way valve, the 4-1 compartment 221 and the 4-4 compartment 224 are formed to be open, and the 4-2 compartment 222 and the 4-3 compartment 223 are formed to be closed. Accordingly, in the fourth mode, the 4-1 compartment 221 and the 4-4 compartment 224 communicate with the first port 141 and the fourth port 144 to open the first 4-way valve.

The 4-5 compartment 225, the 4-8 compartment 228, the 4-6 compartment 226, and the 4-7 compartment 227 which operate as the second 4-way valve in the fourth mode are formed to be open. Accordingly, in the fourth mode, the 4-5 compartment 225 and the 4-8 compartment 228 communicate with the fifth port 145 and the eighth port 148 to open the second 4-way valve, and the 4-6 compartment 226 and the 4-7 compartment 227 communicate with the sixth port 146 and the seventh port 147 to open the second 4-way valve.

Meanwhile, in the fourth mode in which the 4-9 compartment 229, the 4-10 compartment 230, and the 4-11 compartment 231 operate as the first 3-way valve, the 4-9 compartment 229 and the 4-10 compartment 230 are formed to be open, and the 4-11 compartment 231 is formed to be closed. Accordingly, the 4-9 compartment 229 and the 4-10 compartment 230 communicate with the ninth port 149 and the $10^{th}$ port 150 to open the first 3-way valve.

The 4-12 compartment 232, the 4-13 compartment 233, and the 4-14 compartment 234 which operate as the second 3-way valve in the fourth mode are formed to be open. However, a fourth opening cover 235 is provided on an outer side of the 4-12 compartment 232. The fourth opening cover 235 is a portion actually forming an outer surface of the rotor 130, and since the fourth opening cover 235 blocks the 4-12 compartment 232 from the outside, the $12^{th}$ port 152 does not communicate with the 4-12 compartment 232.

Ultimately, the 4-13 compartment 233 and the 4-14 compartment 234 communicate with the $13^{th}$ port 153 and the $14^{th}$ port 154 to open the second 3-way valve. In this case, since the 4-13 compartment 233 and the 4-14 compartment 234 are located in diagonal directions, the 4-13 compartment 233 and the 4-14 compartment 234 indirectly communicate through the 4-12 compartment 232.

In other words, as illustrated in FIG. 12, the 4-1 compartment 221 disposed in the first column is open, the 4-2 compartment 222 disposed in the first column closed, the 4-3 compartment 223 disposed in the second column is closed, the 4-4 compartment 224 disposed in the second column is open, the 4-5 compartment 225 and the 4-6 compartment 226 disposed in the third column are open, the 4-7 compartment 227 and the 4-8 compartment 228 disposed in the fourth column are open, the 4-9 compartment 229 and the 4-10 compartment 230 disposed in the fifth column are open, the 4-11 compartment 231 disposed in the sixth column is closed, the 4-13 compartment 233 disposed in the sixth column is open, the 4-12 compartment 232 disposed in the seventh column is closed by the fourth opening cover 235, and the 4-14 compartment 234 disposed in the seventh column is open.

5. Fifth Mode

FIG. 13 is a bottom view illustrating the rotor in the fifth mode according to one embodiment of the present invention, and FIG. 14 is a view illustrating an open or closed state of the valve in the fifth mode according to one embodiment of the present invention.

Referring to FIG. 13, when the rotor 130 rotates 60° in one direction from the fourth mode, the rotor 130 operates in the fifth mode. In the fifth mode, the unit compartments of the rotor 130 are provided with a 5-1 compartment 241, a 5-2 compartment 242, a 5-3 compartment 243, a 5-4 compartment 244, a 5-5 compartment 245, a 5-6 compartment 246, a 5-7 compartment 247, a 5-8 compartment 248, a 5-9 compartment 249, a 5-10 compartment 250, a 5-11 compartment 251, a 5-12 compartment 252, a 5-13 compartment 253, and a 5-14 compartment 254.

In the fifth mode, the 5-1 to 5-4 compartments 241 to 244 and the first to fourth ports 141 to 144 operate together as a first 4-way valve, the 5-5 to 5-8 compartments 245 to 248 and the fifth to eighth ports 145 to 148 operate together as a second 4-way valve, the 5-9 to 5-11 compartments 249 to 251 and the ninth to $11^{th}$ ports 149 to 151 operate together as a first 3-way valve, and the 5-12 to 5-14 compartments 252 to 254 and the $12^{th}$ to $14^{th}$ ports 152 to 154 operate together as a second 3-way valve.

In the fifth mode in which the 5-1 compartment 241, the 5-4 compartment 244, the 5-2 compartment 242, and the 5-3 compartment 243 operate as the first 4-way valve, the 5-1 compartment 241 and the 5-4 compartment 244 are formed to be open, and the 5-2 compartment 242 and the 5-3 compartment 243 are formed to be closed. Accordingly, in the fifth mode, the 5-1 compartment 241 and the 5-4 compartment 244 communicate with the first port 141 and the fourth port 144 to open the first 4-way valve.

The 5-5 compartment 245, the 5-8 compartment 248, the 5-6 compartment 246, and the 5-7 compartment 247 which operate as the second 4-way valve in the fifth mode are formed to be open. Accordingly, in the fifth mode, the 5-5 compartment 245 and the 5-8 compartment 248 communicate with the fifth port 145 and the eighth port 148 to open the second 4-way valve, and the 5-6 compartment 246 and the 5-7 compartment 247 communicate with the sixth port 146 and the seventh port 147 to open the second 4-way valve.

Meanwhile, in the fifth mode in which the 5-9 compartment 249, the 5-10 compartment 250, and the 5-11 compartment 251 operate as the first 3-way valve, the 5-9 compartment 249 and the 5-10 compartment 250 are formed to be open, and the 5-11 compartment 251 is formed to be closed. Accordingly, the 5-9 compartment 249 and the 5-10 compartment 250 communicate with the ninth port 149 and the $10^{th}$ port 150 to open the first 3-way valve.

The 5-12 compartment 252, the 5-13 compartment 253, and the 5-14 compartment 254 which operate as the second 3-way valve in the fifth mode are formed to be open. Accordingly, the 5-12 compartment 252, the 5-13 compartment 253, and the 5-14 compartment 254 communicate with all the $12^{th}$ port 152, the $13^{th}$ port 153, and the $14^{th}$ port 154 to open the second 3-way valve.

In other words, as illustrated in FIG. 14, the 5-1 compartment 241 disposed in the first column is open, the 5-2 compartment 242 disposed in the first column is closed, the 5-3 compartment 243 disposed in the second column is closed, the 5-4 compartment 244 disposed in the second column is open, the 5-5 compartment 245 and the 5-6 compartment 246 disposed in the third column are open, the 5-7 compartment 247 and the 5-8 compartment 248 disposed in the fourth column are open, the 5-9 compartment 249 and the 5-10 compartment 250 disposed in the fifth column are open, the 5-11 compartment 251 disposed in the sixth column is closed, the 5-13 compartment 253 disposed in the sixth column is open, and the 5-12 compartment 252 and the 5-14 compartment 254 disposed in the seventh column are open.

6. Sixth Mode

Figure 27:
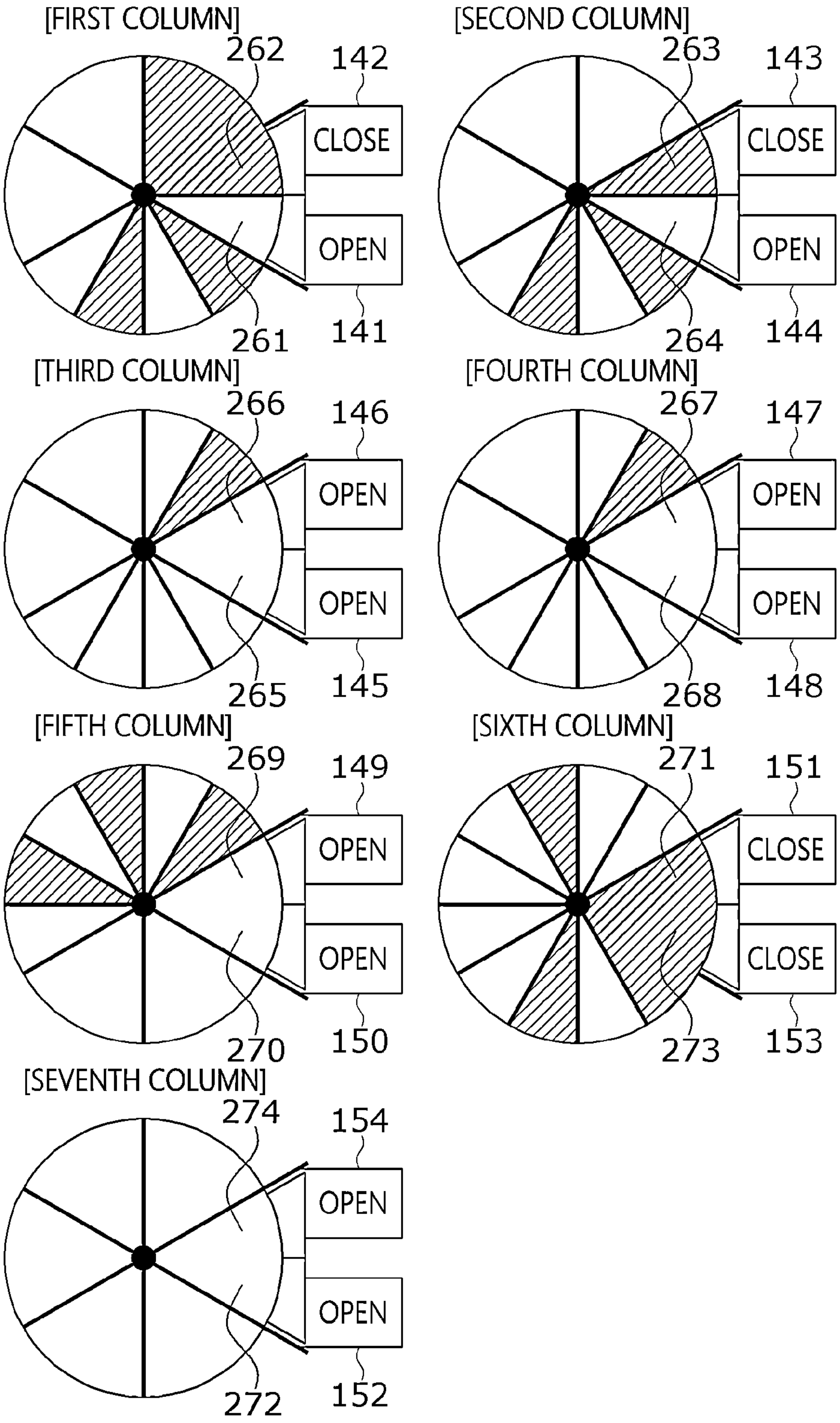
FIG. 27 is a view illustrating an open or closed state of the valve in the sixth mode according to another embodiment of the present invention.

FIG. 15 is a bottom view illustrating the rotor in the sixth mode according to one embodiment of the present invention, and FIG. 27 is a view illustrating an open or closed state of the valve in the sixth mode according to one embodiment of the present invention.

Referring to FIG. 15, when the rotor 130 rotates 600 in one direction from the fifth mode, the rotor 130 operates in the sixth mode. In the sixth mode, the unit compartments of the rotor 130 are provided with a 6-1 compartment 261, a 6-2 compartment 262, a 6-3 compartment 263, a 6-4 compartment 264, a 6-5 compartment 265, a 6-6 compartment 266, a 6-7 compartment 267, a 6-8 compartment 268, a 6-9 compartment 269, a 6-10 compartment 270, a 6-11 compartment 271, a 6-12 compartment 272, a 6-13 compartment 273, and a 6-14 compartment 274.

In the sixth mode, the 6-1 to 6-4 compartments 261 to 264 and the first to fourth ports 141 to 144 operate together as a first 4-way valve, the 6-5 to 6-8 compartments 265 to 268 and the fifth to eighth ports 145 to 148 operate together as a second 4-way valve, the 6-9 to 6-11 compartments 269 to 271 and the ninth to $11^{th}$ ports 149 to 151 operate together as a first 3-way valve, and the 6-12 to 6-14 compartments 272 to 274 and the $12^{th}$ to $14^{th}$ ports 152 to 154 operate together as a second 3-way valve.

In the sixth mode in which the 6-1 compartment 261, the 6-4 compartment 264, the 6-2 compartment 262, and the 6-3 compartment 263 operate as the first 4-way valve, the 6-1 compartment 261 and the 6-4 compartment 264 are formed to be open, and the 6-2 compartment 262 and the 6-3 compartment 263 are formed to be closed. Accordingly, in the sixth mode, the 6-1 compartment 261 and the 6-4 compartment 264 communicate with the first port 141 and the fourth port 144 to open the first 4-way valve.

The 6-5 compartment 265 and the 6-6 compartment 266, the 6-7 compartment 267, and the 6-8 compartment 268 which operate as the second 4-way valve in the sixth mode are formed to be open. Accordingly, in the sixth mode, the 6-5 compartment 265 and the 6-6 compartment 266 communicate with the fifth port 145 and the sixth port 146 to open the second 4-way valve, and the 6-7 compartment 267 and the 6-8 compartment 268 communicate with the seventh port 147 and the eighth port 148 to open the second 4-way valve.

Meanwhile, in the sixth mode in which the 6-9 compartment 269, the 6-10 compartment 270, and the 6-11 compartment 261 operate as the first 3-way valve, the 6-9 compartment 269 and the 6-10 compartment 270 are formed to be open, and the 6-11 compartment 261 is formed to be closed. Accordingly, the 6-9 compartment 269 and the 6-10 compartment 270 communicate with the ninth port 149 and the $10^{th}$ port 150 to open the first 3-way valve.

In the sixth mode in which the 6-12 compartment 272, the 6-14 compartment 274, and the 6-13 compartment 273 operate as the second 3-way valve, the 6-12 compartment 272 and the 6-14 compartment 274 are formed to be open, and the 6-13 compartment 273 is formed to be closed. Accordingly, the 6-12 compartment 272 and the 6-14 compartment 274 communicate with the $12^{th}$ port 152 and the $14^{th}$ port 154 to open the second 3-way valve.

In other words, as illustrated in FIG. 16, the 6-1 compartment 261 disposed in the first column is open, the 6-2 compartment 262 disposed in the first column is closed, the 6-3 compartment 263 disposed in the second column is closed, the 6-4 compartment 264 disposed in the second column is open, the 6-5 compartment 265 and the 6-6 compartment 266 disposed in the third column are open, the 6-7 compartment 267 and the 6-8 compartment 268 disposed in the fourth column are open, the 6-9 compartment 269 and the 6-10 compartment 270 disposed in the fifth column are open, the 6-11 compartment 271 and the 6-13 compartment 273 disposed in the sixth column are closed, and the 6-12 compartment 272 and the 6-14 compartment 274 disposed in the seventh column are open.

The ports 141 to 154 constituting the port unit 140 may be provided as inlet and outlet ports of a fluid for cooling specific components. For example, the first port 141 and the second port 142 may be provided as an inlet port and an outlet port of a fluid for cooling a heater, the fourth port 144 and the third port 143 may be provided as an inlet port and an outlet port of a fluid for cooling a radiator, and the fifth port 145 and the sixth port 46 may be provided as an inlet port and an outlet port of a fluid for cooling a battery. However, examples of the components described above may be differently configured. That is, the components, the inlet ports, and the outlet ports may be changed according to a circuit of a system to which the valve assembly is applied.

While the present invention has been described above with reference to exemplary embodiments, it may be understood by those skilled in the art that various modifications and changes of the present invention may be made within a range not departing from the spirit and scope of the present invention defined by the appended claims.

[Reference Numerals]

| | |
|---|---|
| 10: HOUSING | 12: SHAFT HOLE |
| 20: ACTUATOR | 22: DRIVING SHAFT |
| 30: ROTOR | 32: ROTOR SHAFT |
| 40: PORT UNIT | 41: FIRST PORT |
| 42: SECOND PORT | 43: THIRD PORT |
| 44: FOURTH PORT | 45: FIFTH PORT |
| 46: SIXTH PORT | 51: 1-1 COMPARTMENT |
| 52: 1-2 COMPARTMENT | 53: 1-3 COMPARTMENT |

-continued

[Reference Numerals]

| | |
|---|---|
| 54: 1-4 COMPARTMENT | 55: 1-5 COMPARTMENT |
| 56: 1-6 COMPARTMENT | 61: 2-1 COMPARTMENT |
| 62: 2-2 COMPARTMENT | 63: 2-3 COMPARTMENT |
| 64: 2-4 COMPARTMENT | 65: 2-5 COMPARTMENT |
| 66: 2-6 COMPARTMENT | 71: 3-1 COMPARTMENT |
| 72: 3-2 COMPARTMENT | 73: 3-3 COMPARTMENT |
| 74: 3-4 COMPARTMENT | 75: 3-5 COMPARTMENT |
| 76: 3-6 COMPARTMENT | 81: 4-1 COMPARTMENT |
| 82: 4-2 COMPARTMENT | 83: 4-3 COMPARTMENT |
| 84: 4-4 COMPARTMENT | 85: 4-5 COMPARTMENT |
| 86: 4-6 COMPARTMENT | |
| 110: HOUSING | 112: SHAFT HOLE |
| 120: ACTUATOR | 222: DRIVING SHAFT |
| 230: ROTOR | 132: ROTOR SHAFT |
| 140: PORT UNIT | 141: FIRST PORT |
| 142: SECOND PORT | 143: THIRD PORT |
| 144: FOURTH PORT | 145: FIFTH PORT |
| 146: SIXTH PORT | 147: SEVENTH PORT |
| 148: EIGHTH PORT | 149: NINTH PORT |
| 150: $10^{th}$ PORT | 151: $11^{th}$ PORT |
| 152: $12^{th}$ PORT | 153: $13^{th}$ PORT |
| 154: $14^{th}$ PORT | |
| 161: 1-1 COMPARTMENT | 162: 1-2 COMPARTMENT |
| 163: 1-3 COMPARTMENT | 164: 1-4 COMPARTMENT |
| 165: 1-5 COMPARTMENT | 166: 1-6 COMPARTMENT |
| 167: 1-7 COMPARTMENT | 168: 1-8 COMPARTMENT |
| 169: 1-9 COMPARTMENT | 170: 1-10 COMPARTMENT |
| 171: 1-11 COMPARTMENT | 172: 1-12 COMPARTMENT |
| 173: 1-13 COMPARTMENT | 174: 1-14 COMPARTMENT |
| 175: FIRST OPENING COVER | |
| 181: 2-1 COMPARTMENT | 182: 2-2 COMPARTMENT |
| 183: 2-3 COMPARTMENT | 184: 2-4 COMPARTMENT |
| 185: 2-5 COMPARTMENT | 186: 2-6 COMPARTMENT |
| 187: 2-7 COMPARTMENT | 188: 2-8 COMPARTMENT |
| 189: 2-9 COMPARTMENT | 190: 2-10 COMPARTMENT |
| 191: 2-11 COMPARTMENT | 192: 2-12 COMPARTMENT |
| 193: 2-13 COMPARTMENT | 194: 2-14 COMPARTMENT |
| 201: 3-1 COMPARTMENT | 202: 3-2 COMPARTMENT |
| 203: 3-3 COMPARTMENT | 204: 3-4 COMPARTMENT |
| 205: 3-5 COMPARTMENT | 206: 3-6 COMPARTMENT |
| 207: 3-7 COMPARTMENT | 208: 3-8 COMPARTMENT |
| 209: 3-9 COMPARTMENT | 210: 3-10 COMPARTMENT |
| 211: 3-11 COMPARTMENT | 212: 3-12 COMPARTMENT |
| 213: 3-13 COMPARTMENT | 214: 3-14 COMPARTMENT |
| 215: THIRD OPENING COVER | |
| 221: 4-1 COMPARTMENT | 222: 4-2 COMPARTMENT |
| 223: 4-3 COMPARTMENT | 224: 4-4 COMPARTMENT |
| 225: 4-5 COMPARTMENT | 226: 4-6 COMPARTMENT |
| 227: 4-7 COMPARTMENT | 228: 4-8 COMPARTMENT |
| 229: 4-9 COMPARTMENT | 230: 4-10 COMPARTMENT |
| 231: 4-11 COMPARTMENT | 232: 4-12 COMPARTMENT |
| 233: 4-13 COMPARTMENT | 234: 4-14 COMPARTMENT |
| 235: FOURTH OPENING COVER | |
| 241: 5-1 COMPARTMENT | 242: 5-2 COMPARTMENT |
| 243: 5-3 COMPARTMENT | 244: 5-4 COMPARTMENT |
| 245: 5-5 COMPARTMENT | 246: 5-6 COMPARTMENT |
| 247: 5-7 COMPARTMENT | 248: 5-8 COMPARTMENT |
| 249: 5-9 COMPARTMENT | 250: 5-10 COMPARTMENT |
| 251: 5-11 COMPARTMENT | 252: 5-12 COMPARTMENT |
| 253: 5-13 COMPARTMENT | 254: 5-14 COMPARTMENT |
| 261: 6-1 COMPARTMENT | 262: 6-2 COMPARTMENT |
| 263: 6-3 COMPARTMENT | 264: 6-4 COMPARTMENT |
| 265: 6-5 COMPARTMENT | 266: 6-6 COMPARTMENT |
| 267: 6-7 COMPARTMENT | 268: 6-8 COMPARTMENT |
| 269: 6-9 COMPARTMENT | 270: 6-10 COMPARTMENT |
| 271: 6-11 COMPARTMENT | 272: 6-12 COMPARTMENT |
| 273: 6-13 COMPARTMENT | 274: 6-14 COMPARTMENT |

The invention claimed is:

1. A fluid control valve assembly comprising:

a housing;

an actuator which is coupled to one side of the housing and provides power;

a rotor which is rotatably installed in the housing and receives the power from the actuator; and a port unit coupled to one side of the housing and connected to a fluid hose, wherein the rotor is formed to be divided to control at least two multi-way valves, wherein the rotor is divided into a plurality of compartments in an axial direction and a rotation direction to form unit compartments, wherein at least some of the unit compartments are formed to communicate with each other, wherein some of the unit compartments are open and others are closed, and the open unit compartments communicate with a plurality of ports formed in the port unit; and wherein an opening is formed in the housing to cover the entirety of the plurality of ports, and the port unit is coupled in close contact with the housing such that the opening and the plurality of ports directly communicate with each other.

2. The fluid control valve assembly of claim 1, wherein:

the unit compartments are divided into three rooms in the axial direction and eight rooms in the rotation direction to form a total of 24 rooms; and the port is provided as a total of six ports.

3. The fluid control valve assembly of claim 2, wherein the rotor controls a valve to be driven in a total of four modes rotating in a unit of a central angle of 90°.

4. The fluid control valve assembly of claim 3, wherein, in a bottom view of the unit compartments of the rotor in an $n^{th}$ mode (n is in the range of 1 to 4):

an n-1 compartment is disposed in a first row and a first column;

an n-2 compartment is disposed in a second row and the first column;

an n-3 compartment is disposed in the second row and a second column;

an n-4 compartment is disposed in the first row and the second column;

an n-5 compartment is disposed in the second row and a third column; and an n-6 compartment is disposed in the first row and the third column, wherein the n-1 to n-3 compartments operate as a first 3-way valve, the n-4 to n-6 compartments operate as a second 3-way valve, the port unit is provided as a first port, a second port, a third port, a fourth port, a fifth port, and a sixth port corresponding to the n-1 to n-6 compartments, respectively.

5. The fluid control valve assembly of claim 4, wherein, in the first mode:

the 1-1 compartment and the 1-2 compartment are formed to be open and communicate with the first port and the second port to open the first 3-way valve, and the 1-3 compartment is formed to be closed; and the 1-4 compartment is formed to be closed, and the 1-5 compartment and the 1-6 compartment are formed to be open and communicate with the fifth port and the sixth port to open the second 3-way valve.

6. The fluid control valve assembly of claim 4, wherein, in the second mode:

the 2-1 compartment and the 2-2 compartment are formed to be open and communicate with the first port and the second port to open the first 3-way valve, and the 2-3 compartment is formed to be closed; and the 2-4 compartment and the 2-6 compartment are formed to be open and communicate with the fourth port and the sixth port to open the second 3-way valve, and the 2-5 compartment is formed to be closed.

7. The fluid control valve assembly of claim 4, wherein, in the third mode:

the 3-1 compartment is formed to be closed, and the 3-2 compartment and the 3-3 compartment are formed to be open and communicate with the second port and the third port to open the first 3-way valve; and the 3-4 compartment is formed to be closed, and the 3-5 compartment and the 3-6 compartment are formed to be open and communicate with the fifth port and the sixth port to open the second 3-way valve.

8. The fluid control valve assembly of claim 4, wherein, in the fourth mode:

the 4-1 compartment is formed to be closed, and the 4-2 compartment and the 4-3 compartment are formed to be open and communicate with the second port and the third port to open the first 3-way valve; and the 4-4 compartment and the 4-6 compartment are formed to be open and communicate with the fourth port and the sixth port to open the second 3-way valve, and the 4-5 compartment is formed to be closed.

9. A fluid control valve assembly comprising:

a housing;

an actuator which is coupled to one side of the housing and provides power;

a rotor which is rotatably installed in the housing and receives the power from the actuator; and a port unit coupled to one side of the housing and connected to a fluid hose, wherein the rotor is formed to be divided to control two or more multi-way valves including different numbers (n) of n-way valves, wherein the rotor is divided into a plurality of compartments in an axial direction and a rotation direction to form unit compartments, wherein at least some of the unit compartments are formed to communicate with each other, wherein some of the unit compartments are open and others are closed, and the open unit compartments communicate with a plurality of ports formed in the port unit, and wherein an opening is formed in the housing to cover the entirety of the plurality of ports, and the port unit is coupled in close contact with the housing such that the opening and the plurality of ports directly communicate with each other.

10. The fluid control valve assembly of claim 9, wherein:

the rotor is divided into a plurality of compartments in an axial direction and a rotation direction to form unit compartments; and at least some of the unit compartments are formed to communicate with each other.

11. The fluid control valve assembly of claim 4, wherein:

the unit compartments are divided into seven rooms in the axial direction and 12 rooms in the rotation direction to form a total of 84 rooms; and the port is provided as a total of 14 ports.

12. The fluid control valve assembly of claim 11, wherein the rotor controls a valve to be driven in a total of six modes by rotating in a unit of a central angle of 60°.

13. The fluid control valve assembly of claim 12, wherein, in a bottom view of the unit compartments of the rotor in an $n^{th}$ mode (n is in the range of 1 to 6):

an n-1 compartment is disposed in a second row and a first column;

an n-2 compartment is disposed in a first row and the first column;

an n-3 compartment is disposed in the second row and the first column;

an n-4 compartment is disposed in the second row and a second column;

an n-5 compartment is disposed in the second row and a third column;

an n-6 compartment is disposed in the first row and the third column;

an n-7 compartment is disposed in the first row and a fourth column;

an n-8 compartment is disposed in the second row and the fourth column;

an n-9 compartment is disposed in the first row and a fifth column;

an n-10 compartment is disposed in the second row and the fifth column;

an n-11 compartment is disposed in the first row and a sixth column;

an n-12 compartment is disposed in the second row and a seventh column;

an n-13 compartment is disposed in the second row and the sixth column; and an n-14 compartment is disposed in the first row and the seventh column, wherein the n-1 to n-4 compartments operate as a first 4-way valve, the n-5 to n-8 compartments operate as a second 4-way valve, the n-9 to n-11 compartments operate as a first 3-way valve, the n-12 to n-14 compartments operate as a second 3-way valve, and the port unit is provided as first to 14th ports corresponding to the n-1 to n-14 compartment, respectively.

14. The fluid control valve assembly of claim 12, wherein, in the first mode:

the 1-1 compartment and the 1-2 compartment are formed to be closed, and the 1-3 compartment and the 1-4 compartment are formed to be open and communicate with the third port and the fourth port to open the first 4-way valve;

the 1-5 compartment and the 1-8 compartment are formed to be closed, and the 1-6 compartment and the 1-7 compartment are formed to be open and communicate with the sixth port and the seventh port to open the second 4-way valve;

the 1-9 compartment and the 1-11 compartment are formed to be open and communicate with the ninth port and the $11^{th}$ port to open the first 3-way valve, and the 1-10 compartment is formed to be closed;

the 1-12 compartment, the 1-13 compartment, and the 1-14 compartment are formed to be open, a first opening cover is provided on an outer side of the 1-12 compartment, and the 1-12 compartment does not communicate with the $12^{th}$ port; and the 1-13 compartment and the 1-14 compartment communicate with the $13^{th}$ port and the $14^{th}$ port while communicating through the 1-12 compartment to open the second 3-way valve.

15. The fluid control valve assembly of claim 12, wherein, in the second mode:

the 2-1 compartment and the 2-2 compartment are formed to be open and communicate with the first port and the second port to open the first 4-way valve, and the 2-3 compartment and the 2-4 compartment are formed to be open and communicate with the third port and the fourth port to open the first 4-way valve;

the 2-5 compartment and the 2-6 compartment are formed to be open and communicate with the fifth port and the sixth port to open the second 4-way valve, and the 2-7 compartment and the 2-8 compartment are formed to be open and communicate with the seventh port and the eighth port to open the second 4-way valve;

the 2-9 compartment and the 2-11 compartment are formed to be open and communicate with the ninth port and the $11^{th}$ port to open the first 3-way valve, and the 2-10 compartment is formed to be closed; and the 2-12 compartment and the 2-14 compartment are formed to be open and communicate with the $12^{th}$ port and the $14^{th}$ port to open the second 3-way valve, and the 2-13 compartment is formed to be closed.

16. The fluid control valve assembly of claim 13, wherein, in the third mode:

the 3-1 compartment and the 3-2 compartment are formed to be open and communicate with the first port and the second port to open the first 4-way valve, and the 3-3 compartment and the 3-4 compartment are formed to be open and communicate with the third port and the fourth port to open the first 4-way valve;

the 3-5 compartment 105 and the 3-6 compartment 106 are formed to be open and communicate with the fifth port and the sixth port to open the second 4-way valve, and the 3-7 compartment and the 3-8 compartment are formed to be open and communicate with the seventh port and the eighth port to open the second 4-way valve;

the 3-9 compartment and the 3-11 compartment are formed to be open and communicate with the ninth port and the $11^{th}$ port to open the first 3-way valve, and the 3-10 compartment is formed to be closed;

the 3-12 compartment, the 3-13 compartment, and the 3-14 compartment are formed to be open, a third opening cover is provided on one side of the 3-12 compartment, and the 3-12 compartment does not communicate with the $12^{th}$ port; and the 3-13 compartment and the 3-14 compartment communicate with the $13^{th}$ port and the $14^{th}$ port while communicating through the 3-12 compartment to open the second 3-way valve.

17. The fluid control valve assembly of claim 12, wherein, in the fourth mode:

the 4-5 compartment and the 4-8 compartment are formed to be open and communicate with the fifth port and the eighth port to open the second 4-way valve, and the 4-6 compartment and the 4-7 compartment are formed to be open and communicate with the sixth port and the seventh port to open the second 4-way valve;

the 4-9 compartment and the 4-10 compartment are formed to be open and communicate with the ninth port and the $10^{th}$ port to open the first 3-way valve, and the 4-11 compartment is formed to be closed;

the 4-12 compartment, the 4-13 compartment, and the 4-14 compartment are formed to be open, a fourth opening cover is provided on an outer side of the 4-12 compartment, and the 4-12 compartment does not communicate with the $12^{th}$ port; and the 4-13 compartment and the 4-14 compartment communicate with the $13^{th}$ port and the $14^{th}$ port while communicating through the 4-12 compartment to open the second 3-way valve.

18. The fluid control valve assembly of claim 12, wherein, in the fifth mode:

the 5-1 compartment and the 5-4 compartment are formed to be open and communicate with the first port and the fourth port to open the first 4-way valve, and the 5-2 compartment and the 5-3 compartment are formed to be closed;

the 5-5 compartment and the 5-8 compartment are formed to be open and communicate with the fifth port and the eighth port to open the second 4-way valve, and the 5-6 compartment and the 5-7 compartment are formed to be open and communicate with the sixth port and the seventh port to open the second 4-way valve;

the 5-9 compartment and the 5-10 compartment are formed to be open and communicate with the ninth port and the 10$^{th}$ port to open the first 3-way valve, and the 5-11 compartment is formed to be closed; and the 5-12 compartment, the 5-13 compartment, and the 5-14 compartment are formed to be open and communicate with all the 12$^{th}$ port, the 13$^{th}$ port, and the 14$^{th}$ port to open the second 3-way valve.

19. The fluid control valve assembly of claim 12, wherein, in the sixth mode:

the 6-1 compartment and the 6-4 compartment are formed to be open and communicate with the first port and the fourth port to open the first 4-way valve, and the 6-2 compartment and the 6-3 compartment are formed to be closed;

the 6-5 compartment and the 6-6 compartment are formed to be open and communicate with the fifth port and the sixth port to open the second 4-way valve, and the 6-7 compartment and the 6-8 compartment are formed to be open and communicate with the seventh port and the eighth port to open the second 4-way valve;

the 6-9 compartment and the 6-10 compartment are formed to be open and communicate with the ninth port and the 10$^{th}$ port to open the first 3-way valve, and the 6-11 compartment is formed to be closed; and the 6-12 compartment and the 6-14 compartment are formed to be open and communicate with the 12$^{th}$ port and the 14$^{th}$ port to open the second 3-way valve, and the 6-13 compartment is formed to be closed.

* * * * *